United States Patent
Goodman et al.

(10) Patent No.: US 6,816,332 B2
(45) Date of Patent: Nov. 9, 2004

(54) VERTICAL AND HORIZONTAL PATH SENSING WITHIN A DATA STORAGE AND RETRIEVAL SYSTEM

(75) Inventors: Brian Gerard Goodman, Tucson, AZ (US); Leonard George Jesionowski, Tucson, AZ (US); Robin Daniel Roberts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 10/179,574

(22) Filed: Jun. 25, 2002

(65) Prior Publication Data

US 2003/0234999 A1 Dec. 25, 2003

(51) Int. Cl.[7] .............................................. G11B 15/68
(52) U.S. Cl. ..................... 360/69; 360/92; 369/30.31; 369/30.34; 369/30.36; 414/275; 700/214
(58) Field of Search .............................. 360/69, 71, 92, 360/96.5, 96.6, 98.04, 98.05, 98.06, 99.06, 99.07; 369/30.06, 30.27, 30.28, 30.31, 30.32, 30.33, 30.34, 30.35, 30.36, 30.38, 30.39, 30.43, 30.44, 30.45, 30.5, 30.55, 30.56, 30.57, 30.61, 30.62, 33.01, 34.01; 700/213, 214; 414/268, 269, 270, 273, 274, 275, 276, 277

(56) References Cited

U.S. PATENT DOCUMENTS 5,059,079 A * 10/1991 Foulke et al. ............... 414/275
5,814,171 A    9/1998 Manes et al. ................ 414/274
5,959,866 A *  9/1999 Hanaoka et al. ............. 700/214
6,023,643 A    2/2000 Jesionowski ................. 700/214
6,259,578 B1 * 7/2001 Christiansen et al. ......... 360/92
6,483,655 B1 * 11/2002 Ojima ......................... 360/92

FOREIGN PATENT DOCUMENTS

| EP | 0703578 A2 * | 3/1996 |
| JP | 06-020359 | 1/1994 |
| JP | 6251475 A | 9/1994 |
| JP | 410208343 A * | 8/1998 |
| JP | 2000298908 A * | 10/2000 |

* cited by examiner

Primary Examiner—David Hudspeth
Assistant Examiner—James L. Habermehl
(74) Attorney, Agent, or Firm—Dale F. Regelman

(57) ABSTRACT

An accessor moveably disposed within a data storage and retrieval system which includes at least one electromagnetic radiation emitter and at least one electromagnetic radiation detector, where each emitter/detector combination have a facing relationship. A data storage and retrieval system which includes one or more of Applicants' accessors moveably disposed therein. A method using Applicants' accessor to assist the inventory of Applicants' data storage and retrieval system. A method to prevent collisions between Applicants' accessor and one or more portable data storage cartridges improperly stored within Applicants' data storage and retrieval system. A method using Applicants' accessor to monitor the insertion and/or retrieval of a portable data storage cartridge from a storage slot, a data storage device, an import/export station, and the like. A data storage and retrieval system comprising a computer useable medium having computer readable program code disposed therein for implementing Applicants' methods.

48 Claims, 22 Drawing Sheets

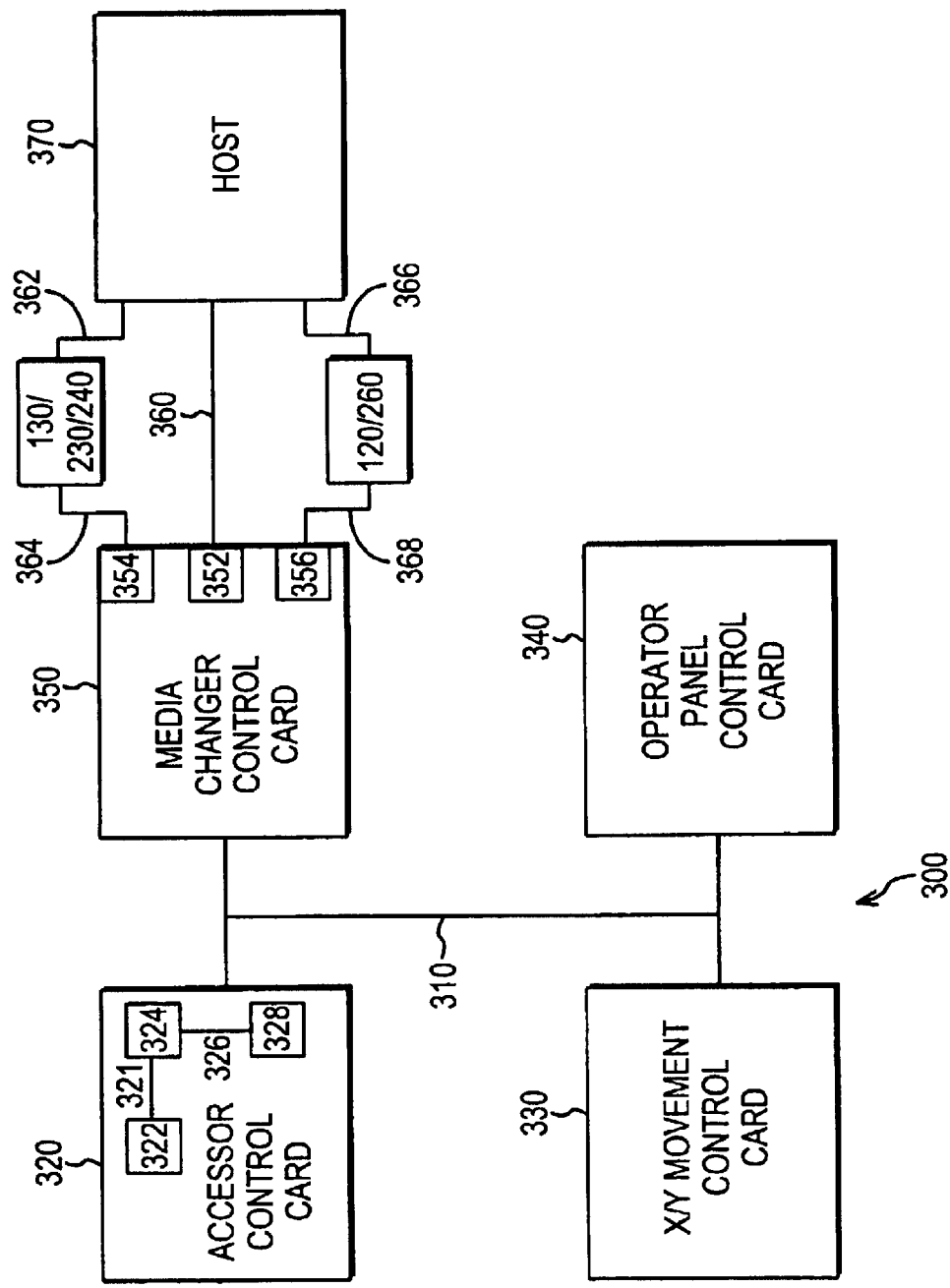

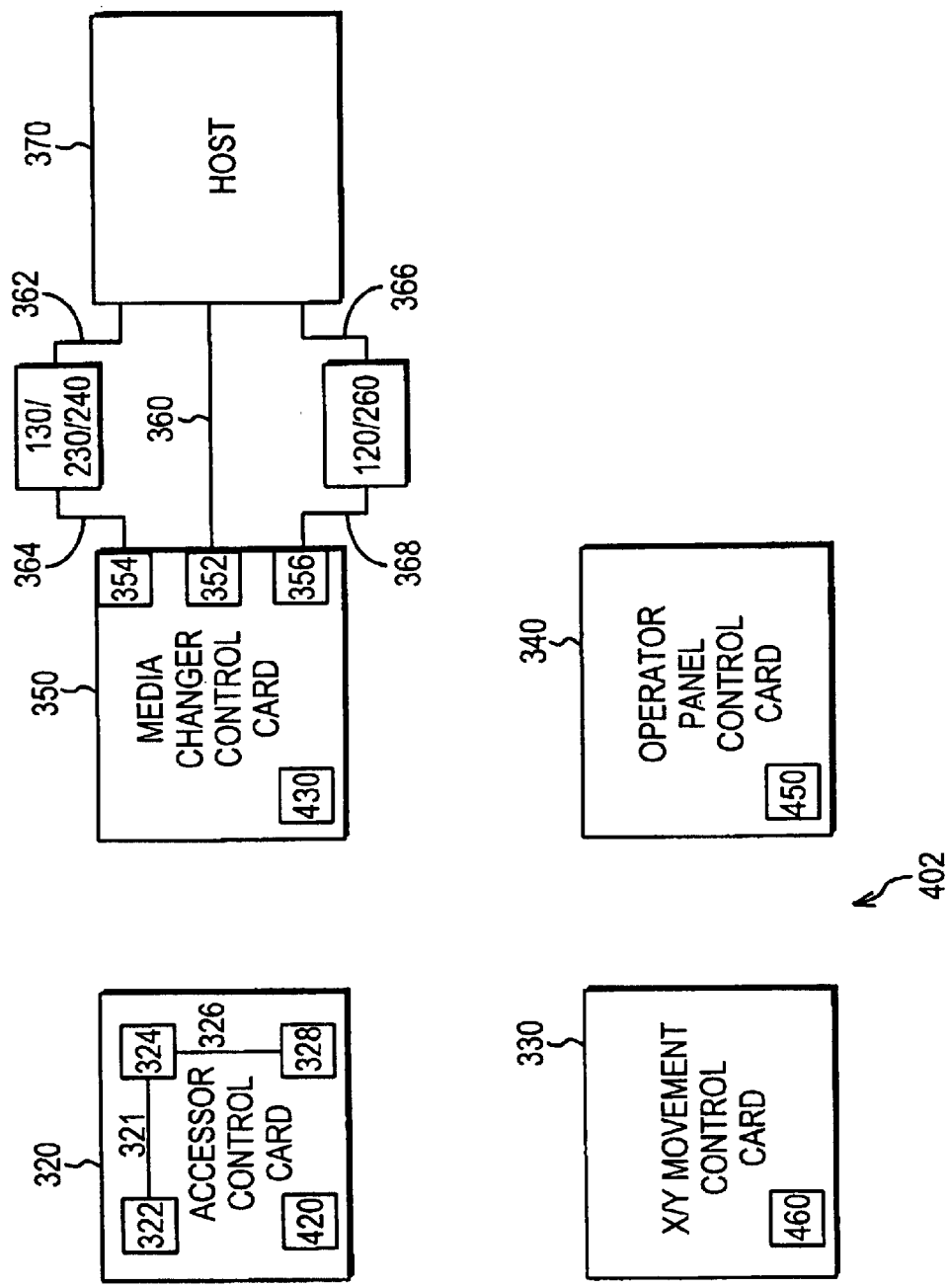

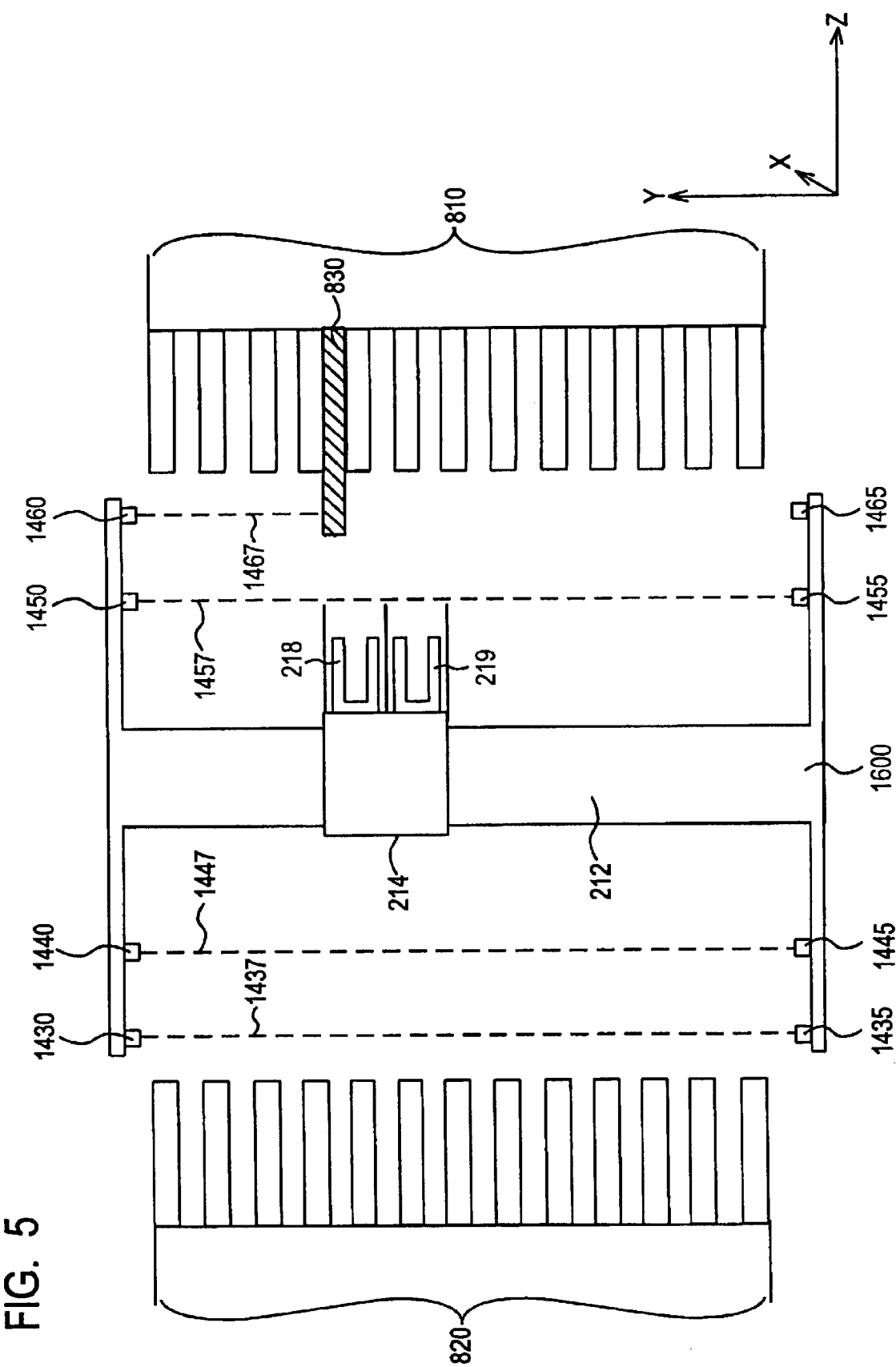

VERTICAL AND HORIZONTAL PATH SENSING WITHIN A DATA STORAGE AND RETRIEVAL SYSTEM

FIELD OF THE INVENTION

Applicants' invention relates to an apparatus and method to monitor the movement along one or more axes of robotic accessors moveably disposed within a data storage and retrieval system.

BACKGROUND OF THE INVENTION

Automated media storage libraries are known for providing cost effective access to large quantities of stored media. Generally, media storage libraries include a large number of storage slots in which are stored data storage media. The portable data storage media are typically housed in a portable container, such as a tape cartridge, an optical cartridge, a disk cartridge, and the like. One (or more) accessors typically access the data storage media from the storage slots and deliver the accessed media to a data storage drive for reading and/or writing data on the accessed media. Suitable electronics operate the accessor(s) and operate the data storage drive(s) to transmit to, and/or to receive data from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3584 Media Storage Library. Some of the automated media storage libraries have dual or multiple accessors to provide a level of redundancy and/or improved performance.

It is advantageous to monitor the placement of portable data storage cartridges within a data storage and retrieval system. Such monitoring can assist to inventory portable data storage cartridges, prevent collisions between accessors and improperly stored portable data storage cartridges, verify proper storage of portable data storage cartridges, and/or verify proper retrieval of portable data storage cartridges. Prior art apparatus and methods utilize path sensors consisting of an emitter and a detector, where a set of such emitters/detectors is disposed at either end of each column/row of storage cells in the library. Such prior art apparatus and methods require the use of many such emitters and detectors. What is needed is an apparatus and method to accomplish these monitoring functions using fewer emitters and detectors. Needless to say, decreasing the number of required emitters and detectors lowers both hardware and maintenance costs.

SUMMARY OF THE INVENTION

Applicants' invention includes an accessor which includes at least one emitter disposed at a first position on the accessor, the top portion for example, where that first emitter is capable of emitting first electromagnetic radiation, in combination with at least one receiver disposed at a second position on that accessor, the bottom portion for example, where that receiver is capable of detecting that first electromagnetic radiation. In certain embodiments, Applicants' accessor further includes a second emitter disposed at a third position on the accessor, where that second emitter is capable of providing second electromagnetic radiation, in combination with a second receiver disposed at a fourth position on the accessor, where that second receiver is capable of detecting the second electromagnetic radiation.

Applicants' invention further includes an automated data storage and retrieval system which includes one or more of Applicants' accessors moveably disposed therein. Applicants' invention further includes a method using Applicants' accessor to assist inventorying the portable data storage cartridges removeably disposed within one or more storage slots in Applicants' data storage and retrieval system. Applicants' invention further includes a method using Applicants' accessor to prevent collisions between Applicants' accessor and one or more portable data storage cartridges improperly disposed within one or more of the afore-described storage slots.

Applicants' invention further includes a method using Applicants' accessor to verify the proper storage of a portable data storage cartridge in one of the afore-described storage slots. Applicants' invention further includes a method using Applicants' accessor to verify the proper retrieval of a portable data storage cartridge from one of the afore-described storage slots.

Applicants' invention further includes a data storage and retrieval system comprising a computer useable medium having computer readable program code disposed therein for implementing Applicants' method to inventory portable data storage cartridges disposed in storage slots disposed in one or more vertical columns/horizontal rows (collectively referred to as "columns" herein). Applicants' invention further includes a data storage and retrieval system comprising a computer useable medium having computer readable program code disposed therein for implementing Applicants' method to prevent a collision between an accessor and one or more portable data storage cartridges improperly disposed in one or more storage slots disposed in one or more vertical or horizontal columns.

Applicants' invention further includes a data storage and retrieval system comprising a computer useable medium having computer readable program code disposed therein for implementing Applicants' method to monitor the retrieval of a portable data storage cartridge from a storage slot disposed in a vertical or horizontal column. Applicants' invention further includes a data storage and retrieval system comprising a computer useable medium having computer readable program code disposed therein for implementing Applicants' method to monitor the insertion of a portable data storage cartridge into a storage slot disposed in a vertical or horizontal column.

BRIEF DESCRIPTION OF THE DRAWINGS

The invention will be better understood from a reading of the following detailed description taken in conjunction with the drawings in which like reference designators are used to designate like elements, and in which:

FIG. 3A is a schematic showing a first embodiment of Applicants' distributed control network which includes a plurality of controller elements and a communication bus disposed within Applicants' data storage and retrieval system;

FIG. 3C is a schematic showing a third embodiment of Applicants' distributed control network which includes a plurality of controller elements and four wireless communication devices;

FIG. 5 is a perspective view showing an alternative embodiment of Applicants' accessor in relation to two columns of storage slots disposed within Applicants' data storage and retrieval system;

DETAILED DESCRIPTION OF THE PREFERRED EMBODIMENTS

Figure 1A:
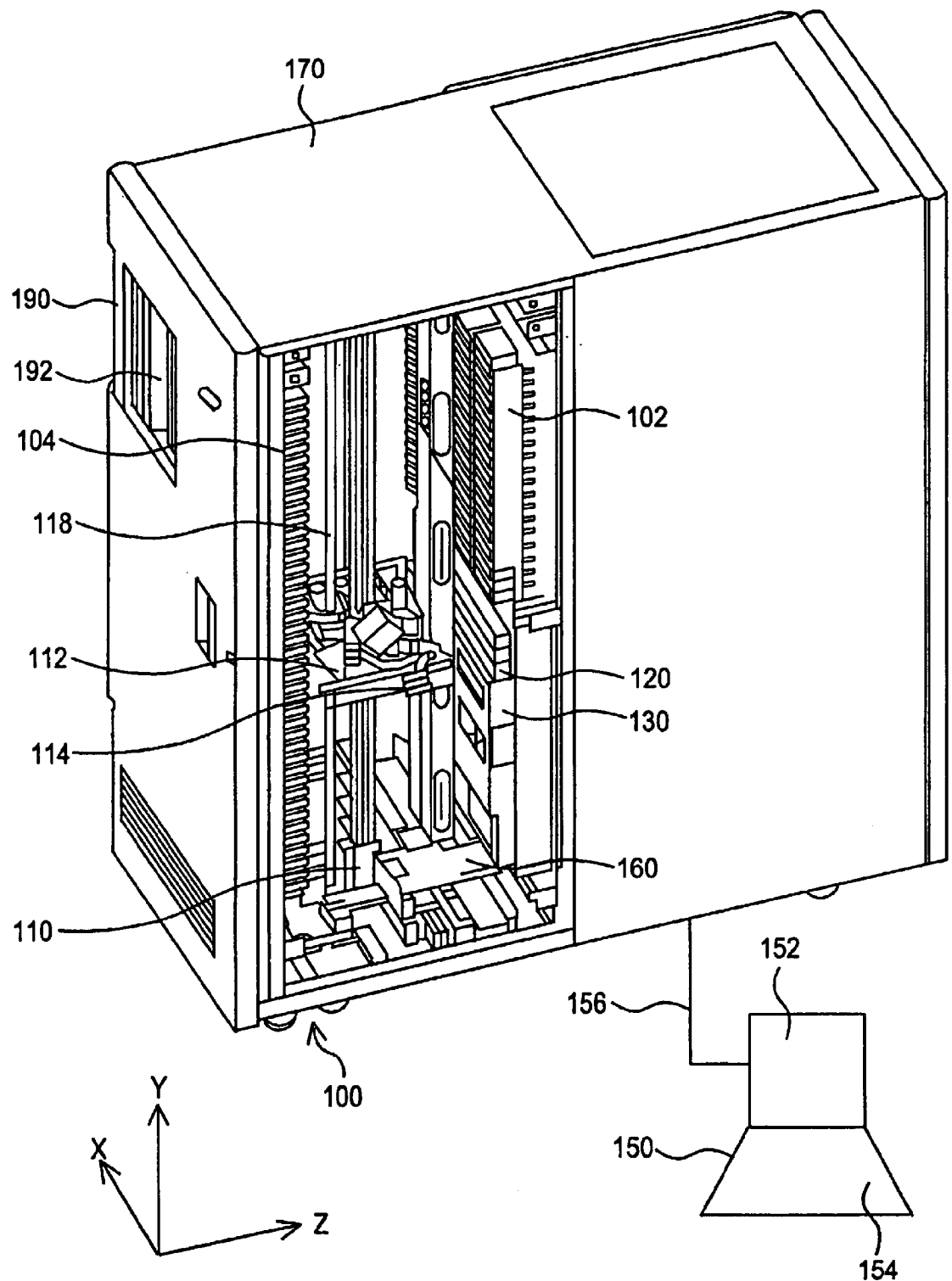
FIG. 1A is a perspective view of a first embodiment of Applicants' data storage and retrieval system.

FIG. 1A shows information storage and retrieval system 100. System 100 includes one or more data storage drives, such as drive 130. Drive 130 comprises a floppy disk drive, an optical disk drive, a magnetic tape drive, an electronic storage media input/output device, and the like. By electronic storage media, Applicants mean a device such as a PROM, EPROM, EEPROM, Flash PROM, compactflash, smartmedia, and the like.

System 100 further includes one or a plurality of portable data storage cartridges (not shown in FIG. 1A) stored in one or a plurality of storage slots disposed in first storage wall 102 and/or second storage wall 104. Each cartridge contains a data storage media internally disposed therein. Such data storage media includes optical media, magnetic media, tape media, electronic media, and the like.

System 100 also includes at least one robotic accessor 110 for transporting a specified portable data storage cartridge between a storage slot disposed in storage wall 102/104 and data storage drive 130. Accessor 110 includes lifting servo section 112 on which is disposed gripper mechanism 114. Lifting servo section 112 moves in the Y direction along rail 118.

Figure 3B:
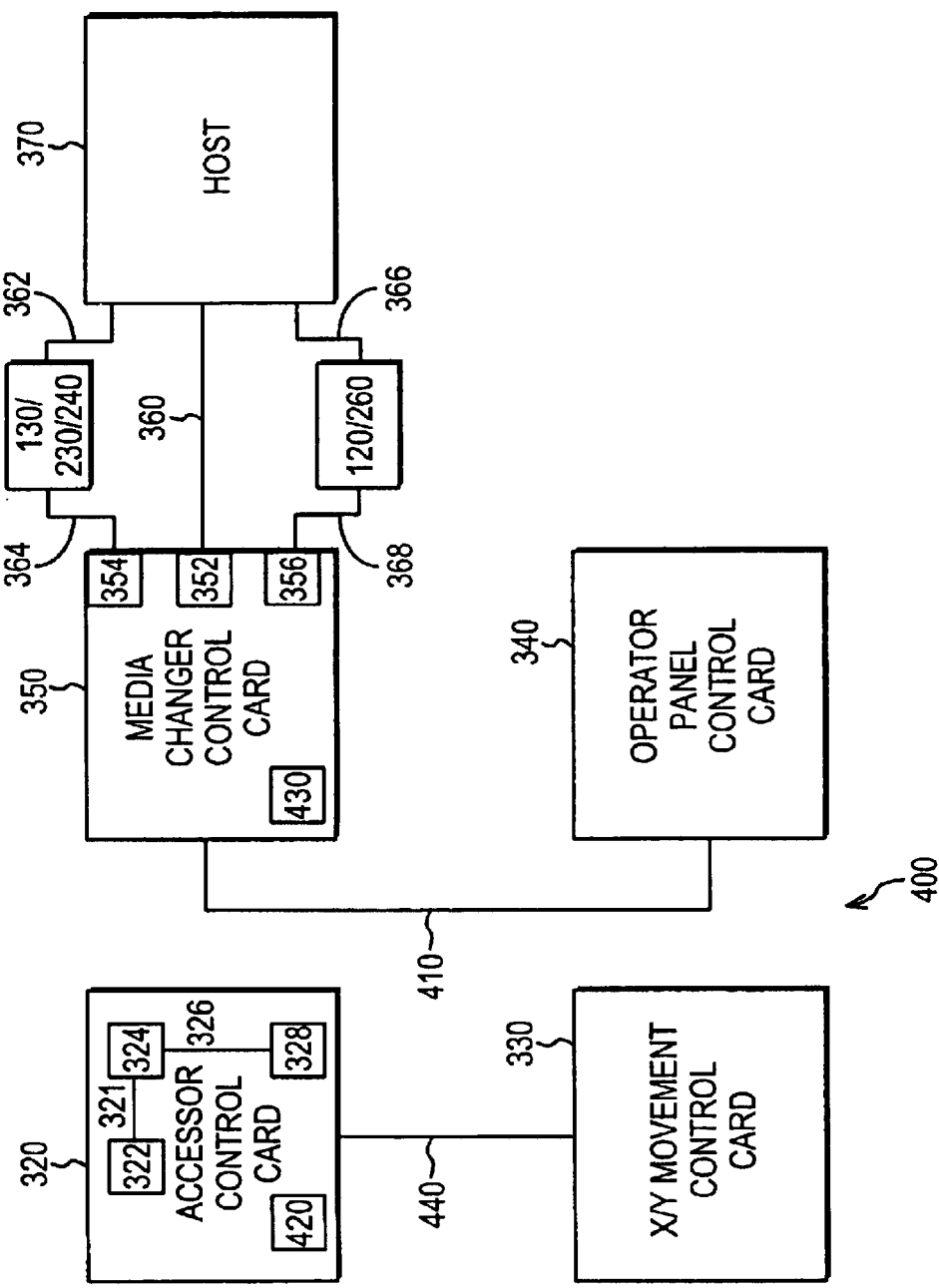
FIG. 3B is a schematic showing a second embodiment of Applicants' distributed control network which includes a plurality of controller elements and two wireless communication devices.

Data storage drive 130 is connected to host computer 370 (FIGS. 3A, 3B, 3C). Control port 120 provides a control path into library 100. In certain embodiments data storage drive 130 and control port 120 communicate with host computer 370 using the same connection.

System 100 also includes system controller 150 in communication via communication link 156 with, and controlling the operation of, accessor 110. Controller 150 includes visual display device 152 and data input device 154. Import/export station 190 includes access door 192 pivotably attached to the front of system 100. Portable data storage cartridges can be placed in the system, or in the alternative, removed from the system, via station 190/access door 192.

System controller 150 further includes at least one computing processor. In certain embodiments, system controller 150 is in communication with host computer 370 (FIGS. 3A, 3B, 3C) from which system controller 150 receives instructions. Data to be recorded onto, or read from, a selected portable data storage cartridge is communicated between drive 130 and host computer 370 either via system controller 150, or directly between drive 130 and host computer 370.

Figure 1B:
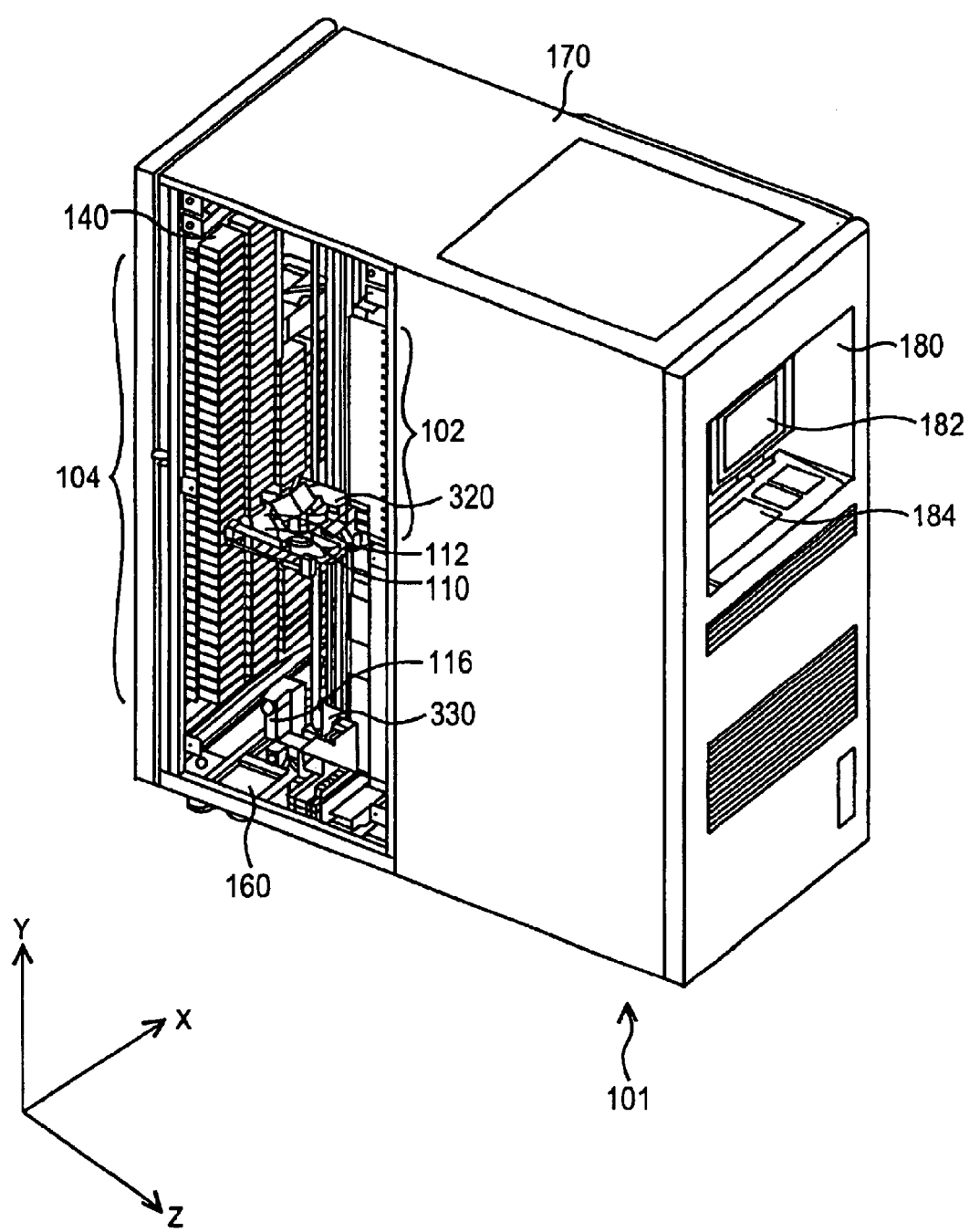
FIG. 1B is a perspective view of a second embodiment of Applicants' data storage and retrieval system.

Referring to FIG. 1B, system 101 includes accessor 110, first storage wall 102, second storage wall 104, data storage drive 130 (not shown in FIG. 1B), and control port 120 (not shown in FIG. 1B). This embodiment of Applicants' data storage and retrieval system further comprises operator input panel 180 which includes visual display device 182 and data input device 184. Unlike system 100 which includes an external controller, system 101 comprises a distributed control network comprising four (4) control cards. These four control cards are shown in FIGS. 3A, 3B, 3C, and include accessor control card 320, X/Y movement control card 330, operator panel control card 340, and media changer control card 350. U.S. Pat. No. 6,356,803, entitled "Automated Data Storage Library Distributed Control System," describes such a distributed control system and is hereby incorporated by reference.

Figure 2:
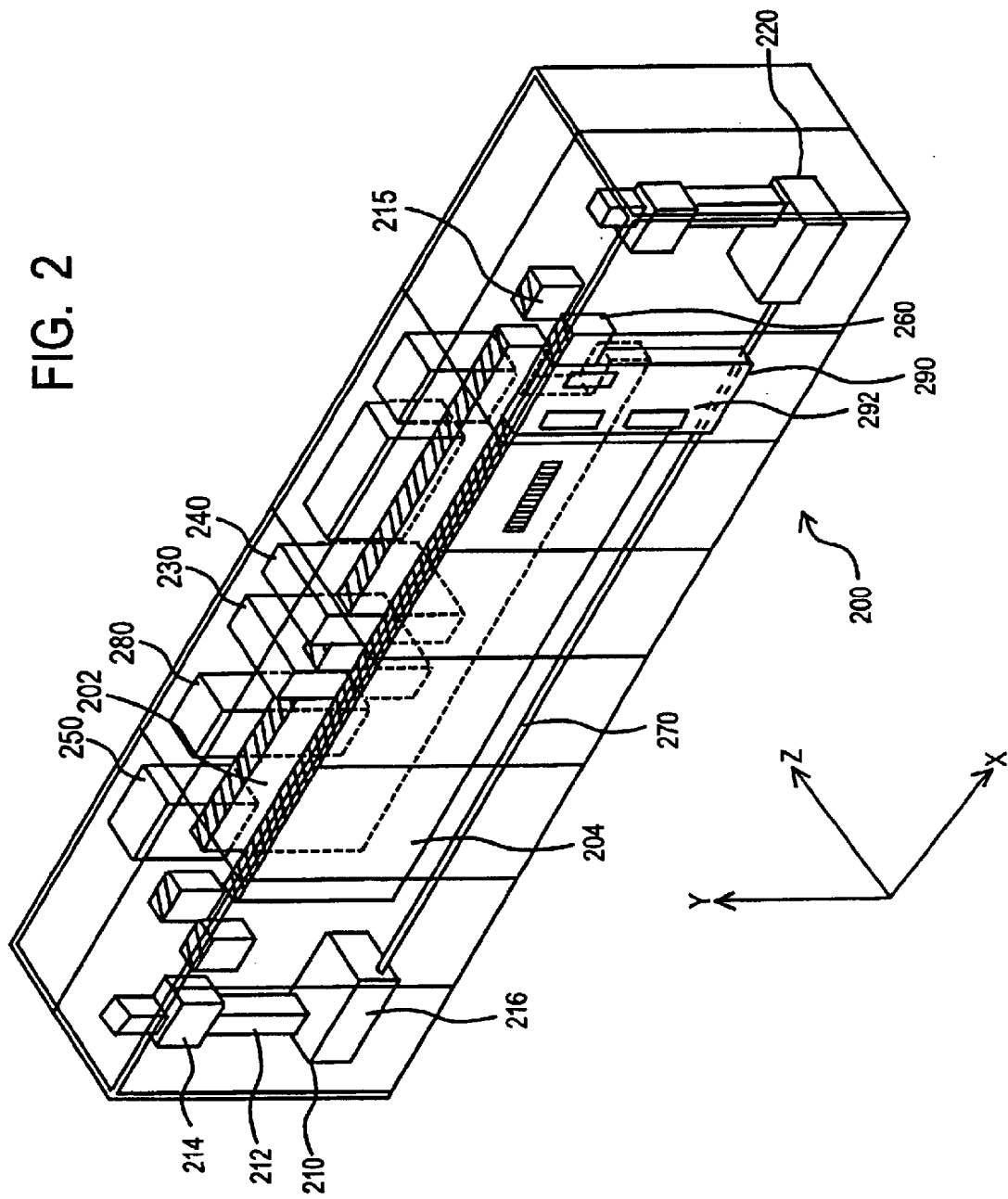
FIG. 2 is a perspective view of a third embodiment of Applicants' data storage and retrieval system.

Referring to FIG. 2, Applicants' automated data storage and retrieval system 200 is shown having a first wall of storage slots 202 and a second wall of storage slots 204.

Portable data storage media are individually stored in these storage slots. Certain of these data storage media are disposed within a portable container. Examples of such data storage media include magnetic storage media, optical storage media of various types, electronic storage media, and the like.

Automated data storage and retrieval system 200 includes one or more accessors, such as accessors 210 and 220. Various embodiments of Applicants' accessors 210 and 220 are shown in greater detail in FIGS. 10, 11, 12, 13, 14, and 15, and are discussed below. Each of Applicants' accessors include a carriage portion 216, a vertical pillar 212, and a lifting servo section 214 moveably disposed on pillar 212.

Accessors 210 and 220 travel bi-directionally along rail 270 in an aisle disposed between first wall of storage slots 202 and second wall of storage slots 204. U.S. Pat. No. 6,038,490, entitled "Automated Data Storage Dual Picker Interference Avoidance", teaches a method to prevent collisions occurring between accessors moveably disposed on the same rail system, and is hereby incorporated by reference herein. Accessors 210 and 220 retrieve portable data storage cartridges disposed in first storage wall 202 and second storage wall 204, and transport those cartridges to data storage drive 230 or to data storage drive 240.

Control port 260 provides a control path into data storage and retrieval system 200. Power component 215 comprises one or more power supply units which supply power to the individual components disposed within Applicant's automated data storage and retrieval system. Import/export station 290 includes access door 292 pivotably attached to the front of system 200. Portable data storage cartridges can be placed in the system, or in the alternative, removed from the system, via station 290 and access door 292.

Operator panel 280 permits a user to communicate with Applicant's automated data storage and retrieval system 200. In certain embodiments, system 200 includes library controller 250. In other embodiments, system 200 includes a distributed control network which includes one or more accessor control cards 320 (FIGS. 3A, 3B, 3C), one or more X/Y movement control cards 330 (FIGS. 3A, 3B, 3C), one or more media changer control cards 350 (FIGS. 3A, 3B, 3C), and an operator panel control card 340 (FIGS. 3A, 3B, 3C) disposed in operator control panel 280.

FIG. 3A shows distributed control network 300 which comprises communication bus 310 interconnecting accessor control card 320, X/Y movement control card 330, operator panel control card 340 and media changer control card 350. In certain embodiments, bus 310 comprises an ethernet interconnection or a CANbus interconnection. Those skilled in the art will appreciate that CANbus technology was developed in the automotive industry, but now has gained wide acceptance in other industries.

In the distributed control network embodiment of system 101 (FIG. 1B), accessor control card 320 (FIGS. 1B, 3A, 3B, 3C) is disposed on lifting servo section 112 (FIG. 1B) of accessor 110 (FIG. 1B). In distributed control network embodiments of system 200 (FIG. 2), accessor control card 320 is disposed on lifting servo section 214 (FIG. 2) of accessors 210 and 220. Accessor control card 320 includes microprocessor 324 (FIGS. 3A, 3B, 3C). Microprocessor 324 functions in this embodiment as the library controller. Microprocessor 324 includes RAM memory. In certain embodiments, battery 322 provides power to that RAM memory via conductor 321. Accessor control card 320 also includes non-volatile memory device 328. Memory device 328 is connected with microprocessor 324 via communication link 326. Alternatively, nonvolatile memory device 328 may be contained in microprocessor 324, and/or the RAM memory may be external to microprocessor 324.

In the distributed control network embodiments of Applicants' systems 101 and 200, X/Y movement control card 330 is disposed on base portion 116 (FIG. 1B) of accessor 110 (FIG. 1B), and on carriage portions 216 (FIG. 2) of accessors 210/220 (FIG. 2). Operator panel control card 340 is disposed within systems 101 (FIG. 1B)/200 (FIG. 2) and is connected to visual display device 182 (FIG. 1B)/data input device 184 (FIG. 1B) and operator control panel 280 (FIG. 2), respectively. In the embodiments shown in FIGS. 3A, 3B, and 3C, media changer control card 350 includes interfaces 352, 354, and 356.

Referring again to FIG. 3A, in certain embodiments host computer 370 communicates with media changer control card 350 via communication link 360 and interface 352. Communication link 360 and interface 352 comprise one control path into Applicants' system. In certain embodiments, host computer 370 communicates with media changer control card 350 via control port 120 (FIGS. 1A, 3A, 3B, 3C)/control port 260 (FIGS. 2, 3A, 3B, 3C) using communication links 366/368 and interface 356. Control port 120/260 in combination with links 366/368 and interface 356 provides a second control path into Applicants' system.

In certain embodiments, host computer 370 communicates directly with data storage drives 130 (FIGS. 1A, 3A, 3B, 3C)/230 (FIGS. 2, 3A, 3B, 3C)/240 (FIGS. 2, 3A, 3B, 3C) via communication link 362. In these embodiments, drives 130/230/240 communicate with media changer control card 350 via communication link 364 and interface 354. In still other embodiments, host computer 370 communicates with media changer control card 350 via communication link 360/interface 352, and/or through control port 120/260 using links 366/368 and interface 356, and/or through data storage drive 130/230/240 using links 362/364 and interface 354. Communication links 360, 362, 364, 366, and 368, are each selected from the group comprising serial interface, such as an RS-422 interface/RS-232 interface, a local area network, a private wide area network, a public wide area network, a SCSI bus, a Fibre Channel bus, and combinations thereof.

FIG. 3B shows embodiment 400 of Applicants' distributed control network. In this embodiment, accessor control card 320 includes wireless communication device 420. Media changer control card 350 includes wireless communication device 430. Communication link 440 interconnects accessor control card 320 and X/Y control card 330. Communication link 410 interconnects operator panel control card 340 and media changer control card 350.

Media changer control card 350 and/or operator panel control card 340 communicate(s) with accessor control card 320 and/or X/Y movement control card 330 via wireless communication using wireless communication devices 420 and 430. Such wireless communication employs emissions having frequencies in the radio frequency spectrum, i.e. frequencies between about $10^5$ hertz to about $10^8$ hertz; microwave frequency spectrum, i.e. frequencies from about $10^8$ hertz to about $10^{11}$ hertz; infrared frequency spectrum, i.e. frequencies from about $10^{11}$ hertz to about $10^{14}$ hertz; visible light spectrum, i.e. frequencies of about $10^{14}$ hertz to about $10^{15}$ hertz; ultraviolet frequency spectrum, i.e. frequencies from about $10^{15}$ to about $10^{16}$ hertz, and combinations thereof.

FIG. 3C shows embodiment 402 of Applicants' distributed control network. In this embodiment, X/Y movement control card 330 includes wireless communication device 460 and operator panel control card includes wireless communication device 450. Accessor control card 320, X/Y movement control card 330, operator panel control card 340, and media changer control card 350, communicate with one another via wireless communication using wireless communication devices 420, 430, 450, and 460. Such wireless communication employs emissions having frequencies in the radio frequency spectrum, i.e. frequencies between about $10^5$ hertz to about $10^8$ hertz; microwave frequency spectrum, i.e. frequencies from about $10^8$ hertz to about $10^{11}$ hertz; infrared frequency spectrum, i.e. frequencies from about $10^{11}$ hertz to about $10^{14}$ hertz; visible light spectrum, i.e. frequencies of about $10^{14}$ hertz to about $10^{15}$ hertz; ultraviolet frequency spectrum, i.e. frequencies from about $10^{15}$ to about $10^{16}$ hertz, and combinations thereof.

Figure 10:
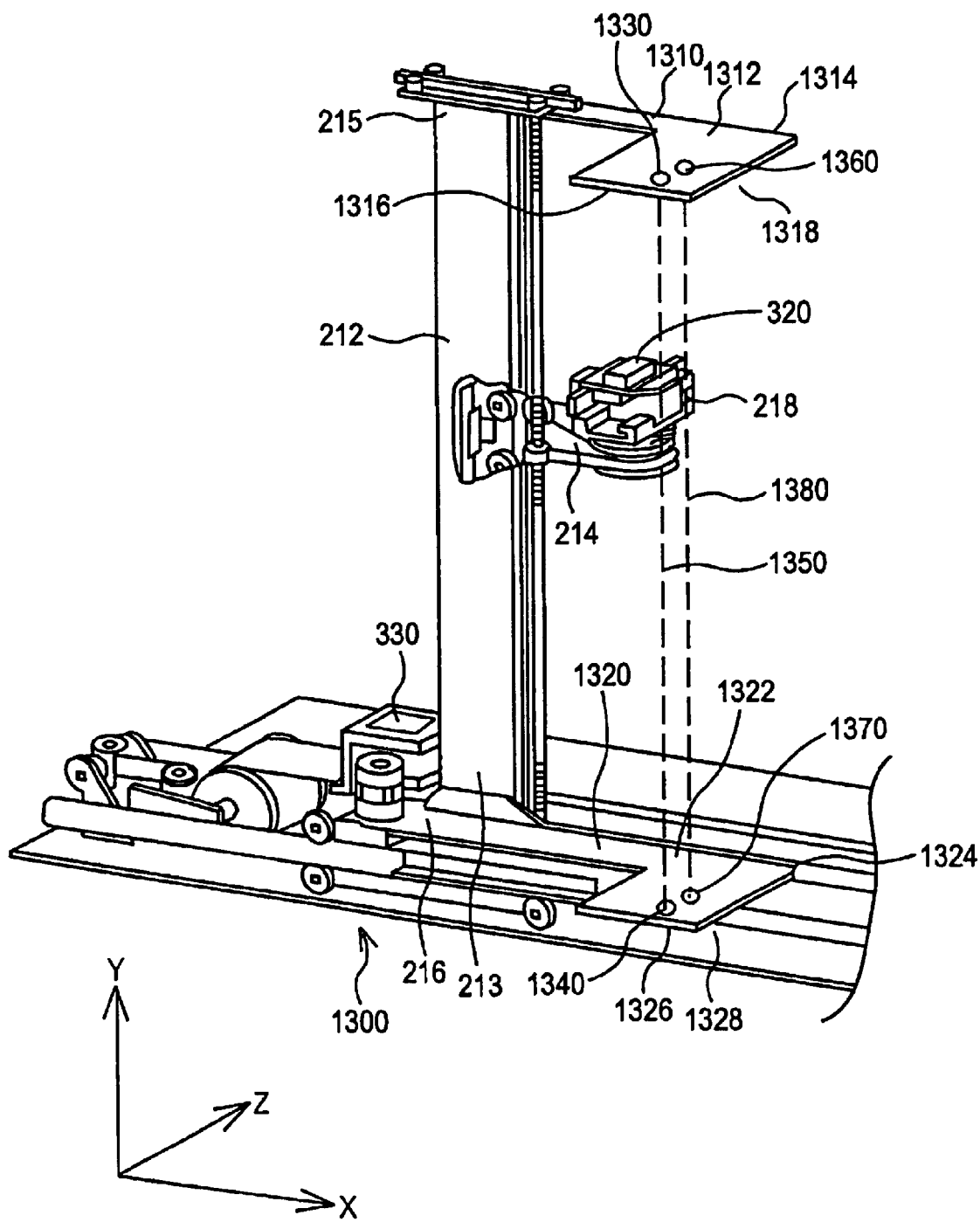
FIG. 10 is a perspective view of a first embodiment of Applicants' accessor.

FIG. 10 shows embodiment 1300 of Applicants' accessor. Accessor 1300 includes carriage portion 216 (FIGS. 2, 10–15), pillar 212 (FIGS. 2, 10–15), and lifting servo section 214 (FIGS. 2, 10–15). Pillar 212 includes first end 213 attached to carriage portion 216. "L-shaped" assembly 1310 is disposed adjacent to second end 215 of pillar 212. Assembly 1310 includes surface 1312, opposing surface 1318, edge 1314 and opposing edge 1316. As those skilled in the art will appreciate, if the Y axis shown in FIG. 10 comprises the vertical axis, then assembly 1310 is disposed adjacent the top portion of accessor 1300. As those skilled in the art will further appreciate, if the Y axis comprises a horizontal axis, then assembly 1310 is disposed adjacent a first side of accessor 1300.

Accessor 1300 further includes at least one gripper mechanism disposed on lifting servo section 214, namely first gripper mechanism 218. In certain embodiments, lifting servo section 214 includes a second gripper mechanism.

In certain embodiments accessor 1300 is moveably disposed in a data storage and retrieval system which includes Applicants' distributed control network discussed above. In these embodiments, accessor 1300 further includes an accessor control card 320 (FIGS. 3A, 3B, 3C, 10, 11, 12, 13, 14, 15) and an X/Y movement control card 330 (FIGS. 3A, 3B, 3C, 10, 11, 12, 13, 14, 15). Accessor control card 320 is disposed on lifting servo section 214 and X/Y movement control card 330 is disposed on carriage assembly 216.

"L-shaped" assembly 1320 is disposed adjacent carriage portion 216. As those skilled in the art will appreciate, if the Y axis shown in FIG. 10 comprises the vertical axis, then assembly 1320 is disposed adjacent the bottom portion of accessor 1300. As those skilled in the art will further appreciate, if the Y axis comprises a horizontal axis, then assembly 1320 is disposed adjacent a second side of accessor 1300. Assembly 1320 includes surface 1322, opposing surface 1328, edge 1324 and opposing edge 1326.

Devices 1330 and 1340 comprise an emitter/receiver combination, wherein one of those devices can provide electromagnetic radiation having a first frequency, and the other device can detect radiation having that first frequency. Beam 1350 comprises electromagnetic radiation having the first frequency. Devices 1330 and 1340 are not disposed on lifting servo section 214 or on gripper mechanism 218.

In certain embodiments, device 1330 is disposed on surface 1318 adjacent edge 1316. In certain embodiments, device 1330 is disposed on surface 1312 adjacent an aperture (not shown in FIG. 10) disposed through assembly 1310 adjacent edge 1316, such that device 1330 has a facing relationship with surface 1322. In certain embodiments, device 1330 is disposed in an aperture (not shown in FIG. 10) disposed through assembly 1310 adjacent edge 1316, such that device 1330 has a facing relationship with surface 1322.

In certain embodiments, device 1340 is disposed on surface 1322 adjacent edge 1326. In certain embodiments, device 1340 is disposed on surface 1328 adjacent an aperture (not shown in FIG. 10) disposed through assembly 1320 adjacent edge 1326, such that device 1340 has a facing relationship with surface 1318. In certain embodiments, device 1340 is disposed in an aperture (not shown in FIG. 10) disposed through assembly 1320 adjacent edge 1326, such that device 1340 has a facing relationship with surface 1318.

In certain embodiments, device 1330 comprises an emitter which can provide electromagnetic radiation having the first frequency and device 1340 comprises a receiver capable of detecting electromagnetic radiation having that first frequency. In alternative embodiments, device 1340 comprises an emitter which can provide electromagnetic radiation having the first frequency and device 1330 comprises a receiver capable of detecting electromagnetic radiation having that first frequency. In certain embodiments, electromagnetic radiation of the first frequency comprises radiation in the infrared spectrum.

Devices 1360 and 1370 comprise an emitter/receiver combination, wherein one of those devices can provide electromagnetic radiation having a second frequency, and the other device can detect electromagnetic radiation having that second frequency. Beam 1380 comprises electromagnetic radiation having the second frequency. Devices 1360 and 1370 are not disposed on lifting servo section 214 or on gripper mechanism 218.

In certain embodiments, device 1360 is disposed on surface 1318 adjacent edge 1314. In certain embodiments, device 1360 is disposed on surface 1312 adjacent an aperture (not shown in FIG. 10) disposed through assembly 1310 adjacent edge 1314, such that device 1360 has a facing relationship with surface 1322. In certain embodiments, device 1360 is disposed in an aperture (not shown in FIG. 10) disposed through assembly 1310 adjacent edge 1314, such that device 1360 has a facing relationship with surface 1322.

In certain embodiments, device 1370 is disposed on surface 1322 adjacent edge 1324. In certain embodiments, device 1370 is disposed on surface 1328 adjacent an aperture (not shown in FIG. 10) disposed through assembly 1320 adjacent edge 1324, such that device 1370 has a facing relationship with surface 1318. In certain embodiments, device 1370 is disposed in an aperture (not shown in FIG. 10) disposed through assembly 1320 adjacent edge 1324, such that device 1370 has a facing relationship with surface 1318.

In certain embodiments, device 1360 comprises an emitter which can provide electromagnetic radiation having the second frequency and device 1370 comprises a receiver capable of detecting electromagnetic radiation having that second frequency. In alternative embodiments, device 1370 comprises an emitter which can provide electromagnetic radiation having the second frequency and device 1360 comprises a receiver capable of detecting electromagnetic radiation having that second frequency. In certain embodiments, electromagnetic radiation of the second frequency comprises radiation in the infrared spectrum. In certain embodiments, the first frequency is substantially equal to the second frequency. By substantially equal, Applicants' mean the first frequency equals the second frequency plus or minus about ten percent. In other embodiments, the first frequency differs from the second frequency.

Figure 11:
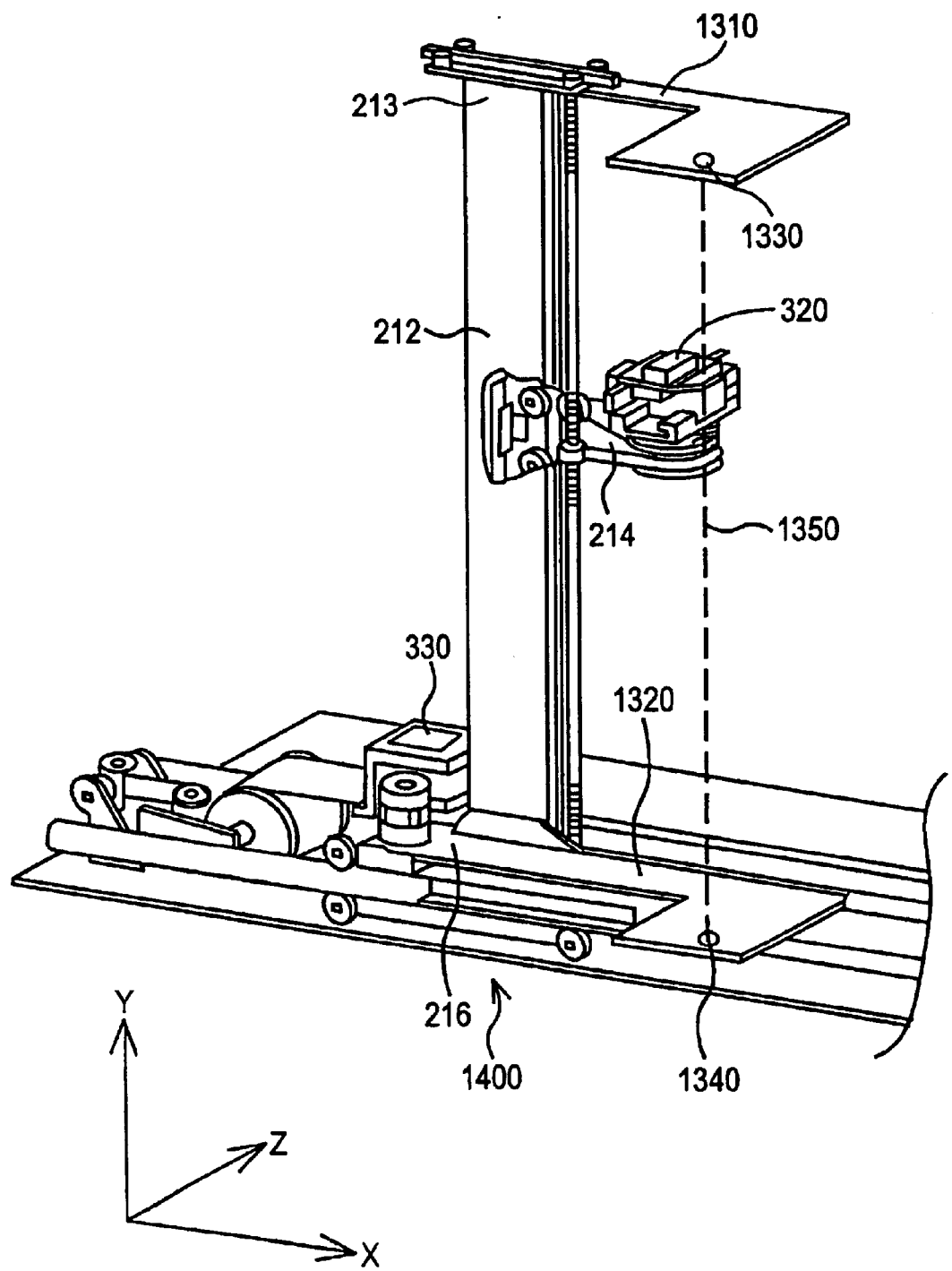
FIG. 11 is a perspective view of a second embodiment of Applicants' accessor.

FIG. 11 shows embodiment 1400 of Applicants' accessor. Accessor 1400 is identical to accessor 1300 (FIG. 10) except that accessor 1400 does not include a pair of emitters and a pair of detectors. Rather, accessor 1400 includes devices 1330 (FIG. 10) and 1340 (FIG. 10) which are capable of emitting and detecting beam 1350 (FIG. 10) as described above.

Figure 12:
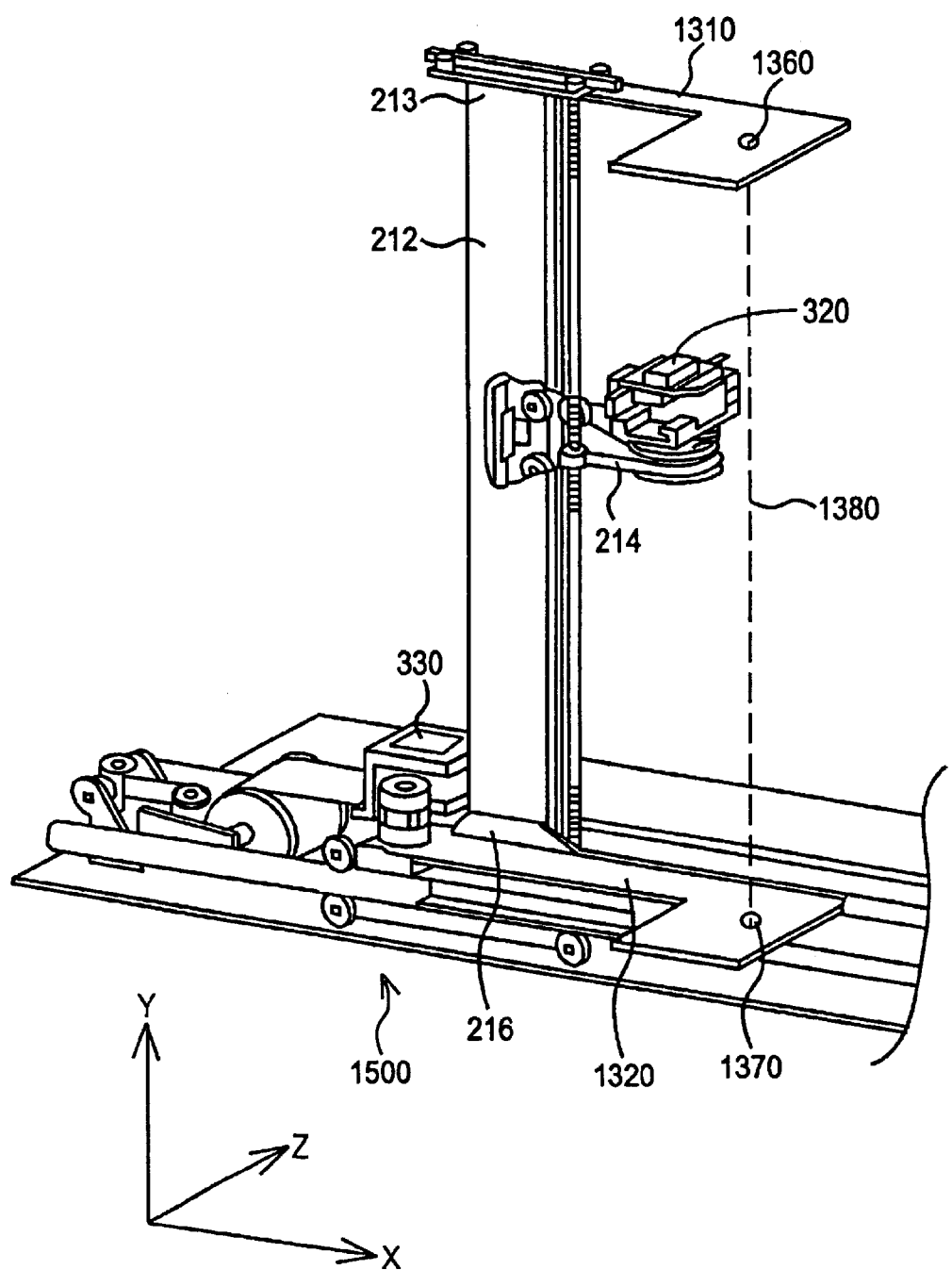
FIG. 12 is a perspective view of a third embodiment of Applicants' accessor.

FIG. 12 shows embodiment 1500 of Applicants' accessor. Accessor 1500 is identical to accessor 1300 (FIG. 10) except that accessor 1500 does not include a pair of emitters and a pair of detectors. Rather, accessor 1500 includes devices 1360 (FIG. 10) and 1370 (FIG. 10) which are capable of emitting and detecting beam 1380 (FIG. 10) as described above.

Figure 13:
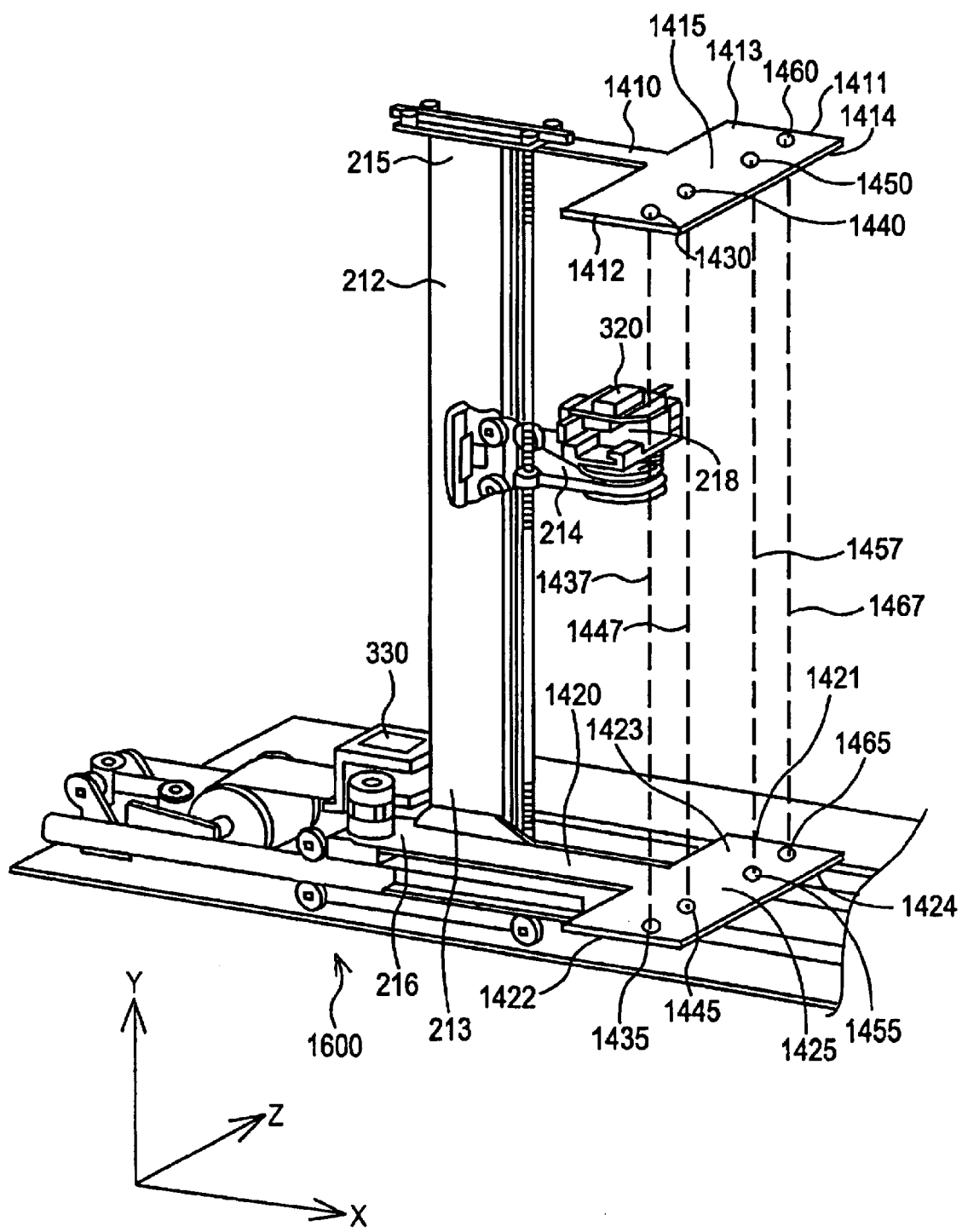
FIG. 13 is a perspective view of a fourth embodiment of Applicants' accessor.

FIG. 13 shows embodiment 1600 of Applicants' accessor. Accessor 1600 includes carriage portion 216 (FIGS. 2, 10–15), pillar 212 (FIGS. 2, 10–15), and lifting servo section 214 (FIGS. 2, 10–15). Pillar 212 includes first end 213 attached to carriage portion 216. "T-shaped" assembly 1410 is disposed adjacent second end 215 of pillar 212. Assembly 1410 includes surface 1413, opposing surface 1414, edge 1411, opposing edge 1412, and middle portion 1415. As those skilled in the art will appreciate, if the Y axis shown in FIG. 13 comprises the vertical axis, then assembly 1410 is disposed adjacent the top portion of accessor 1600. As those skilled in the art will further appreciate, if the Y axis comprises a horizontal axis, then assembly 1410 is disposed adjacent a first side of accessor 1600.

Accessor 1600 further includes at least one gripper mechanism disposed on lifting servo section 214, namely first gripper mechanism 218. In certain embodiments, lifting servo section 214 includes a second gripper mechanism.

In certain embodiments accessor 1600 is moveably disposed in a data storage and retrieval system which includes Applicants' distributed control network discussed above. In these embodiments, accessor 1600 further includes an accessor control card 320 (FIGS. 3A, 3B, 3C, 10, 11, 12, 13, 14, 15) and an X/Y movement control card 330 (FIGS. 3A, 3B, 3C, 10, 11, 12, 13, 14, 15). Accessor control card 320 is disposed on lifting servo section 214 and X/Y movement control card 330 is disposed on carriage assembly 216.

Carriage portion 216 of accessor 1600 includes "T-shaped" assembly 1420. As those skilled in the art will appreciate, if the Y axis shown in FIG. 13 comprises the vertical axis, then assembly 1420 is disposed adjacent the bottom portion of accessor 1600. As those skilled in the art will further appreciate, if the Y axis comprises a horizontal axis, then assembly 1420 is disposed adjacent a second side of accessor 1600. Assembly 1420 includes surface 1423, opposing surface 1424, edge 1421, opposing edge 1422, and middle portion 1425.

Assembly 1410 includes devices 1430, 1440, 1450, and 1460. Assembly 1420 includes devices 1435, 1445, 1455, and 1465. Referring again to FIGS. 1A and 1B, accessor 110 includes assembly 1410 disposed adjacent the inner surface of top portion 170. Accessor 110 further includes assembly 1420 disposed adjacent floor portion 160.

Referring again to FIG. 13, devices 1430 and 1435 comprise an emitter/receiver combination, wherein one of those devices can provide electromagnetic radiation having a third frequency, and the other device can detect radiation having that third frequency. Beam 1437 comprises electromagnetic radiation having the third frequency. In certain embodiments, the third frequency is substantially equal to one or more of the first frequency and the second frequency. In other embodiments, the third frequency differs from each of the first frequency and the second frequency.

In certain embodiments, device 1430 is disposed on surface 1414 adjacent edge 1412. In certain embodiments, device 1430 is disposed on surface 1413 adjacent an aperture (not shown in FIG. 13) disposed through assembly 1410 adjacent edge 1412, such that device 1430 has a facing relationship with surface 1423. In certain embodiments, device 1430 is disposed in an aperture (not shown in FIG. 13) disposed through assembly 1410 adjacent edge 1412, such that device 1430 has a facing relationship with surface 1423.

In certain embodiments, device 1435 is disposed on surface 1423 adjacent edge 1422. In certain embodiments, device 1435 is disposed on surface 1424 adjacent an aperture (not shown in FIG. 13) disposed through assembly 1420 adjacent edge 1422, such that device 1435 has a facing relationship with surface 1414. In certain embodiments, device 1435 is disposed in an aperture (not shown in FIG. 13) disposed through assembly 1420 adjacent edge 1422, such that device 1435 has a facing relationship with surface 1414.

In certain embodiments, device 1430 comprises an emitter which can provide electromagnetic radiation having the third frequency and device 1435 comprises a receiver capable of detecting electromagnetic radiation having that third frequency. In alternative embodiments, device 1435 comprises an emitter which can provide electromagnetic radiation having the third frequency and device 1430 comprises a receiver capable of detecting electromagnetic radiation having that third frequency. In certain embodiments, electromagnetic radiation of the third frequency comprises radiation in the infrared spectrum.

Devices 1440 and 1445 comprise an emitter receiver combination, wherein one of those devices can provide electromagnetic radiation having a fourth frequency, and the other device can detect radiation having that fourth frequency. Beam 1447 comprises electromagnetic radiation having the fourth frequency. In certain embodiments, the fourth frequency is substantially equal to one or more of the first frequency, the second frequency, and the third frequency. In other embodiments, the fourth frequency differs from each of the first frequency, the second frequency, and the third frequency.

In certain embodiments, device 1440 is disposed on surface 1414 between edge 1412 and middle portion 1415 and adjacent middle portion 1415. In certain embodiments, device 1440 is disposed on surface 1413 adjacent an aperture (not shown in FIG. 13) disposed through assembly 1410 adjacent middle portion 1415, such that device 1440 has a facing relationship with surface 1423. In certain embodiments, device 1440 is disposed in an aperture (not shown in FIG. 13) disposed through assembly 1410 adjacent middle portion 1415, such that device 1440 has a facing relationship with surface 1423.

In certain embodiments, device 1445 is disposed on surface 1423 between edge 1422 and middle portion 1425 and adjacent middle portion 1425. In certain embodiments, device 1445 is disposed on surface 1424 adjacent an aperture (not shown in FIG. 13) disposed through assembly 1420 adjacent middle portion 1425, such that device 1445 has a facing relationship with surface 1414. In certain embodiments, device 1445 is disposed in an aperture (not shown in FIG. 13) disposed through assembly 1420 adjacent middle portion 1445, such that device 1445 has a facing relationship with surface 1414.

In certain embodiments, device 1440 comprises an emitter which can provide electromagnetic radiation having the fourth frequency and device 1445 comprises a receiver capable of detecting electromagnetic radiation having that fourth frequency. In alternative embodiments, device 1445 comprises an emitter which can provide electromagnetic radiation having the fourth frequency and device 1440 comprises a receiver capable of detecting electromagnetic radiation having that fourth frequency. In certain embodiments, electromagnetic radiation of the fourth frequency comprises radiation in the infrared spectrum.

Devices 1450 and 1455 comprise an emitter/receiver combination, wherein one of those devices can provide electromagnetic radiation having a fifth frequency, and the other device can detect radiation having that fifth frequency. Beam 1457 comprises electromagnetic radiation having the fifth frequency. In certain embodiments, the fifth frequency is substantially equal to one or more of the first frequency, the second frequency, the third frequency, and the fourth frequency. In other embodiments, the fifth frequency differs from each of the first frequency, the second frequency, the third frequency, and the fourth frequency.

In certain embodiments, device 1450 is disposed on surface 1414 between edge 1411 and middle portion 1415 and adjacent middle portion 1415. In certain embodiments, device 1450 is disposed on surface 1413 adjacent an aperture (not shown in FIG. 13) disposed through assembly 1410 adjacent middle portion 1415, such that device 1450 has a facing relationship with surface 1423. In certain embodiments, device 1450 is disposed in an aperture (not shown in FIG. 13) disposed through assembly 1410 adjacent middle portion 1415, such that device 1450 has a facing relationship with surface 1423.

In certain embodiments, device 1455 is disposed on surface 1423 between edge 1421 and middle portion 1425 and adjacent middle portion 1425. In certain embodiments, device 1455 is disposed on surface 1424 adjacent an aperture (not shown in FIG. 13) disposed through assembly 1420 adjacent middle portion 1425, such that device 1455 has a facing relationship with surface 1414. In certain embodiments, device 1455 is disposed in an aperture (not shown in FIG. 13) disposed through assembly 1420 adjacent middle portion 1425, such that device 1455 has a facing relationship with surface 1414.

In certain embodiments, device 1450 comprises an emitter which can provide electromagnetic radiation having the fifth frequency and device 1455 comprises a receiver capable of detecting electromagnetic radiation having that fifth frequency. In alternative embodiments, device 1455 comprises an emitter which can provide electromagnetic radiation having the fifth frequency and device 1450 comprises a receiver capable of detecting electromagnetic radiation having that fifth frequency. In certain embodiments, electromagnetic radiation of the fifth frequency comprises radiation in the infrared spectrum.

Devices 1460 and 1465 comprise an emitter/receiver combination, wherein one of those devices can provide electromagnetic radiation having a sixth frequency, and the other device can detect radiation having that sixth frequency. Beam 1467 comprises electromagnetic radiation having the sixth frequency. In certain embodiments, the sixth frequency is substantially equal to one or more of the first frequency, the second frequency, the third frequency, the fourth frequency, and the fifth frequency. In other embodiments, the sixth frequency differs from each of the first frequency, the second frequency, the third frequency, the fourth frequency, and the fifth frequency.

In certain embodiments, device 1460 is disposed on surface 1414 adjacent edge 1411. In certain embodiments, device 1460 is disposed on surface 1413 adjacent an aperture (not shown in FIG. 13) disposed through assembly 1410 adjacent edge 1411, such that device 1460 has a facing relationship with surface 1423. In certain embodiments, device 1460 is disposed in an aperture (not shown in FIG. 13) disposed through assembly 1410 adjacent edge 1411, such that device 1460 has a facing relationship with surface 1423.

In certain embodiments, device 1465 is disposed on surface 1423 adjacent edge 1421. In certain embodiments, device 1465 is disposed on surface 1424 adjacent an aperture (not shown in FIG. 13) disposed through assembly 1420 adjacent edge 1421, such that device 1465 has a facing relationship with surface 1414. In certain embodiments, device 1465 is disposed in an aperture (not shown in FIG. 13) disposed through assembly 1420 adjacent edge 1421, such that device 1465 has a facing relationship with surface 1414.

In certain embodiments, device 1460 comprises an emitter which can provide electromagnetic radiation having the sixth frequency and device 1465 comprises a receiver capable of detecting electromagnetic radiation having that sixth frequency. In alternative embodiments, device 1465 comprises an emitter which can provide electromagnetic radiation having the sixth frequency and device 1460 comprises a receiver capable of detecting electromagnetic radiation having that sixth frequency. In certain embodiments, electromagnetic radiation of the sixth frequency comprises radiation in the infrared spectrum.

Figure 14:
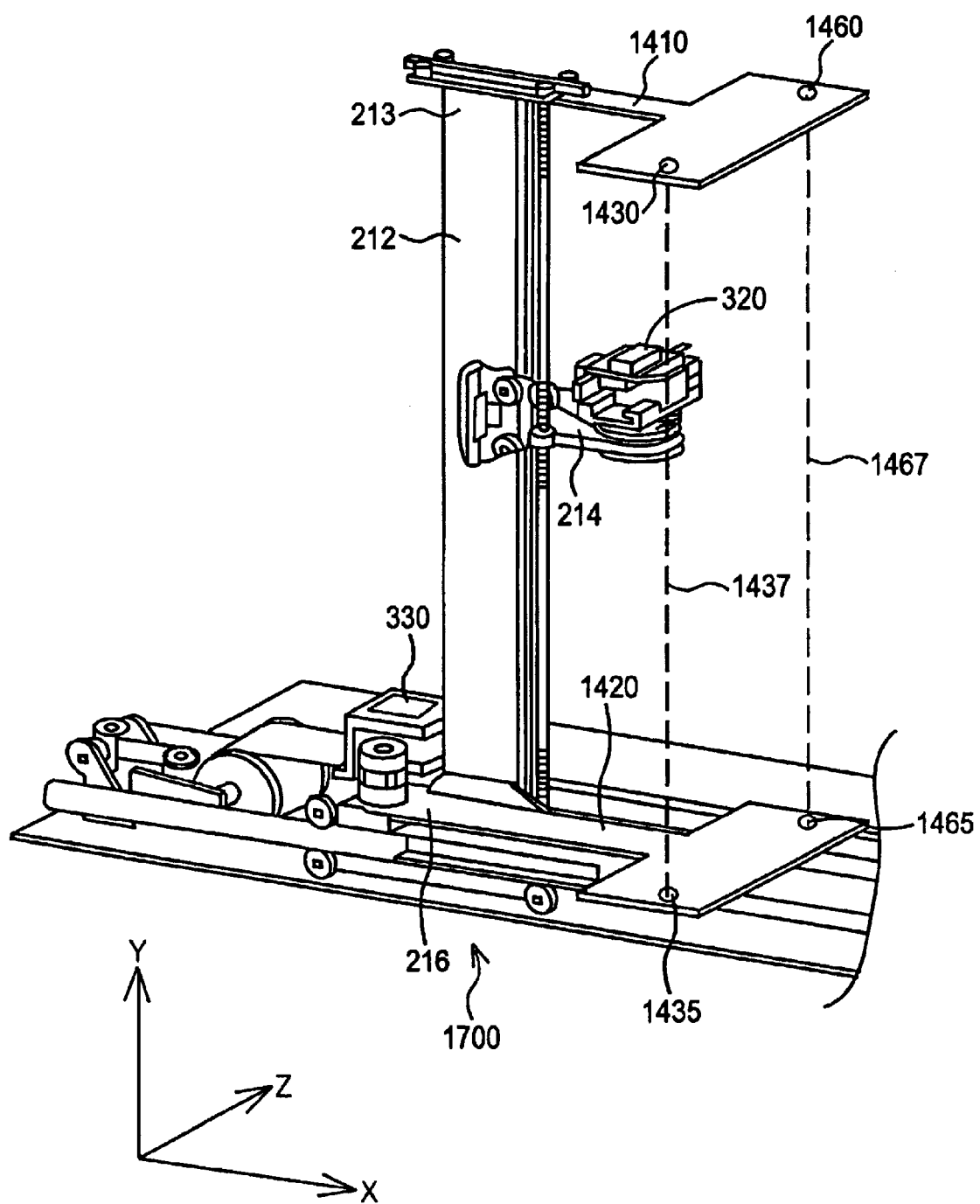
FIG. 14 is a perspective view of a fifth embodiment of Applicants' accessor.

FIG. 14 shows embodiment 1700 of Applicants' accessor. Accessor 1700 is identical to accessor 1600 (FIG. 13) except that accessor 1700 does not include four emitters and four detectors. Rather, accessor 1700 includes a pair of emitters in combination with a pair of detectors, which are capable of emitting and detecting beams 1437 (FIGS. 13, 14) and 1467 (FIGS. 13, 14) as described above.

Figure 15:
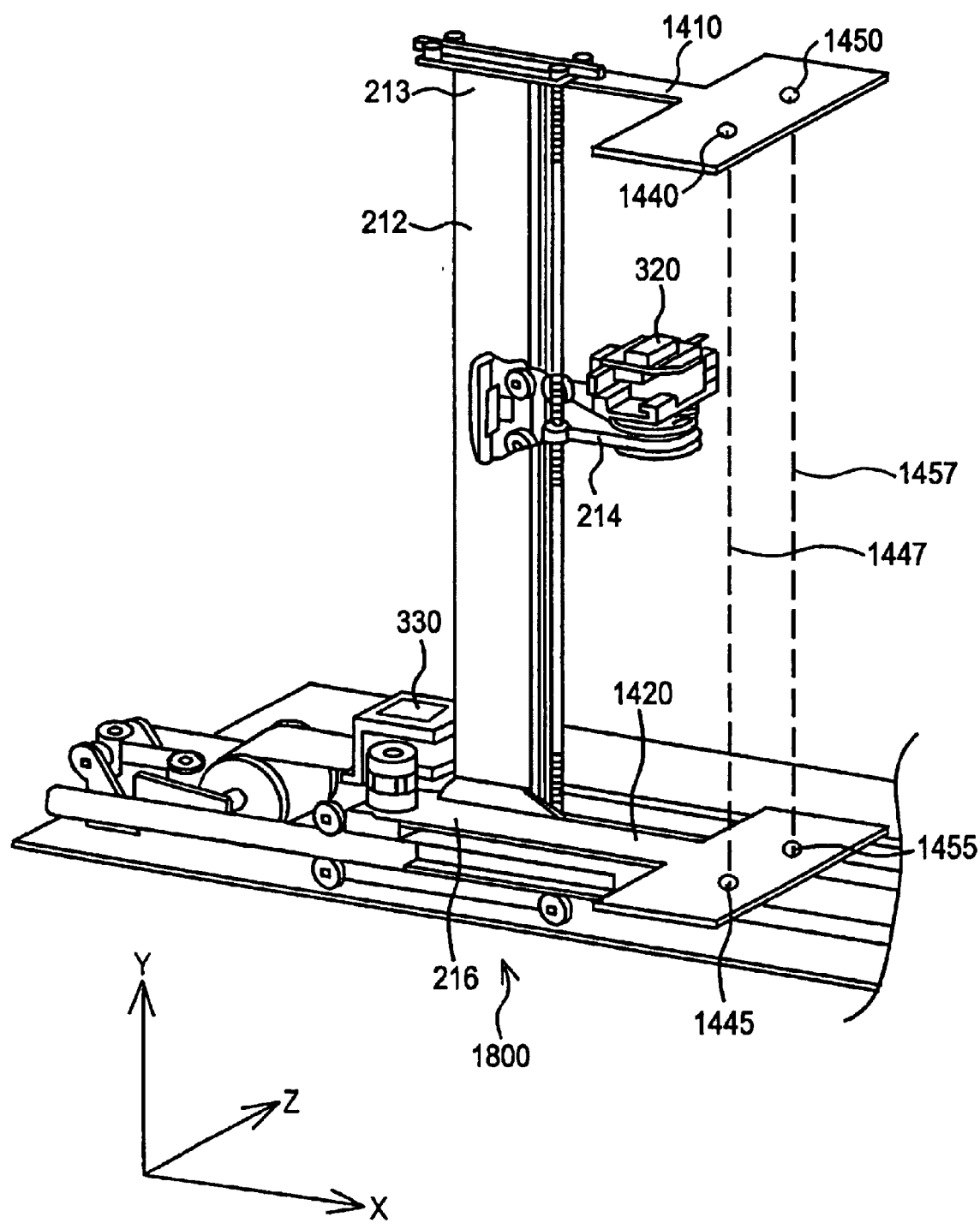
FIG. 15 is a perspective view of a sixth embodiment of Applicants' accessor.

FIG. 15 shows embodiment 1800 of Applicants' accessor. Accessor 1800 is identical to accessor 1600 (FIG. 13) except that accessor 1800 does not include four emitters and four detectors. Rather, accessor 1800 includes a pair of emitters in combination with a pair of detectors, which are capable of emitting and detecting beams 1447 (FIGS. 13, 15) and 1457 (FIGS. 13, 15) as described above.

Figure 4A:
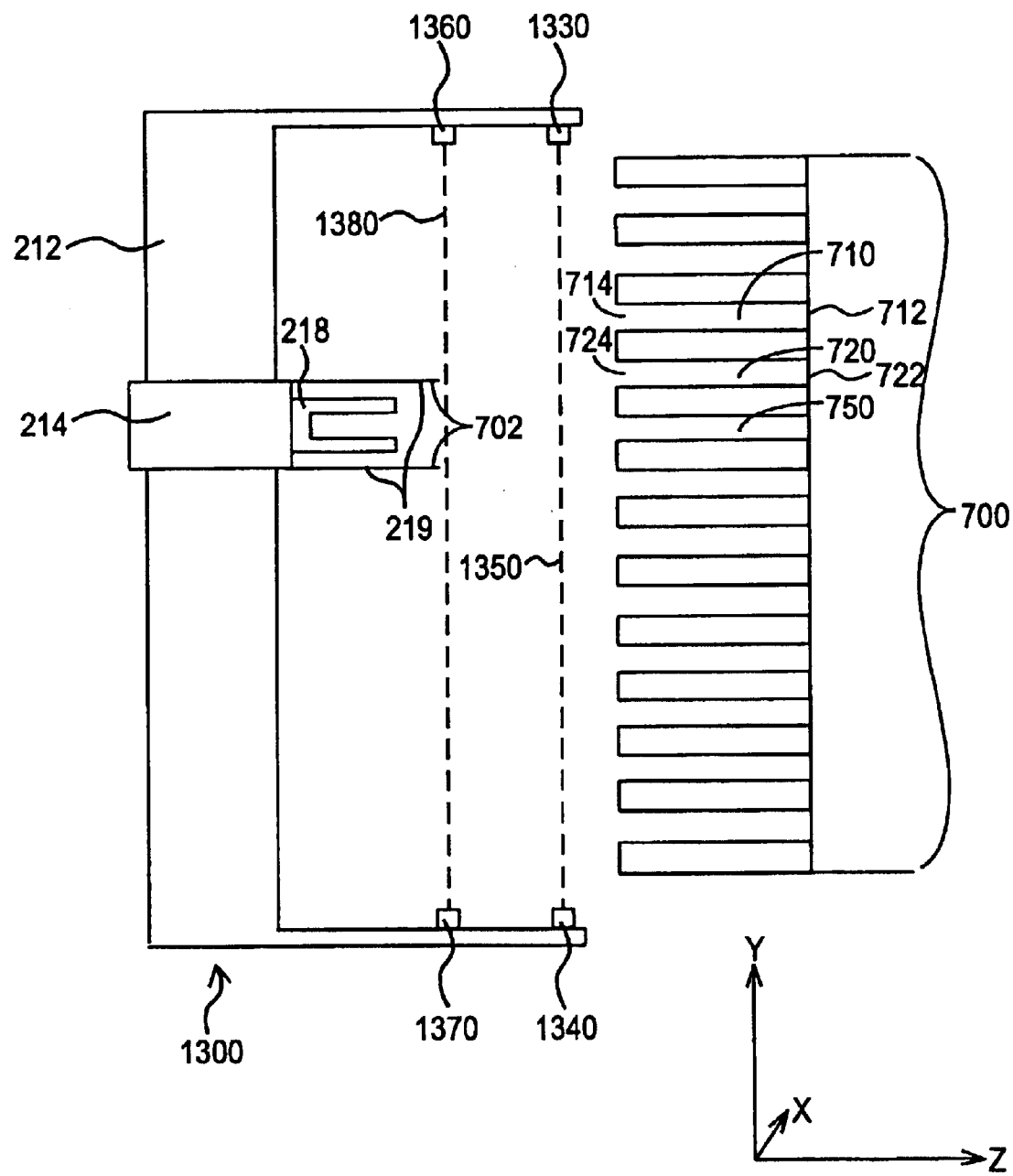
FIG. 4A is a perspective view of one embodiment of Applicants' accessor positioned adjacent a column of storage slots disposed within Applicants' data storage and retrieval system.

FIG. 4A shows a view along the X axis of FIGS. 1A, 1B, 2. Accessor 1300 (FIG. 10) is shown positioned adjacent column of storage slots 700. As those skilled in the art will appreciate, if the Y axis comprises the vertical axis, then column 700 comprises a vertical column. As those skilled in the art will further appreciate, if the Y axis comprises a horizontal axis, then column 700 comprises a horizontal column.

Column 700 comprises a portion of storage wall 102 (FIGS. 1A, 1B)/202 (FIG. 2), respectively. Column 700 includes storage slots 710, 720, and 750, which are empty in FIG. 4A. Storage slots 710 and 720 include rear portions 712 and 722, respectively, and open ends 714 and 724, respectively. FIG. 4A shows gripper mechanism 218 in a first position, wherein gripper mechanism 218 extends outwardly from lifting servo section 214 toward column 700.

FIGS. 4A through 4E illustrate embodiments of Applicants' method using Applicants' accessors described above. For illustrative purposes, accessor 1300 (FIG. 10) is shown in FIGS. 4A through 4E. All of the embodiments of Applicants' method described below may be implemented using accessor 110 or accessor 1600. In addition, certain embodiments of Applicants' method can be implemented using any of accessors 110, 1300, 1400, 1500, 1600, 1700, or 1800. Furthermore, although FIGS. 4A–4E show a single gripper mechanism disposed on accessor 1300, in other embodiments of Applicants' method the accessor used includes a second gripper mechanism.

Referring to FIG. 4A, gripper mechanism 218 is shown disposed within housing 219. Housing 219 is shown in cross section. Gripper mechanism 218 is shown in a retracted position within housing 219. Gripper mechanism moves in the +Z and −Z direction, and can extend in the +Z direction beyond distal ends 702 of housing 219.

Figure 4B:
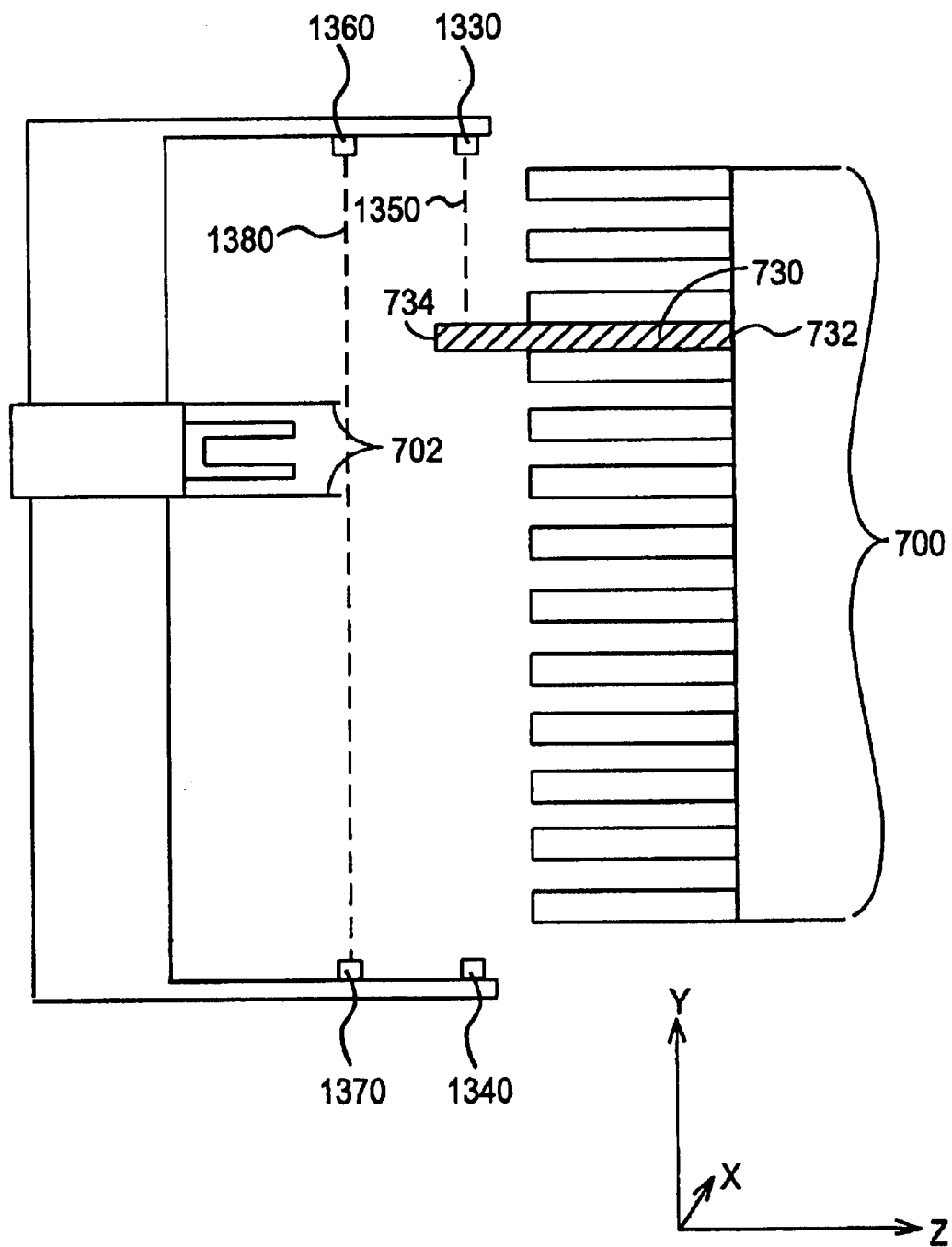
FIG. 4B is a perspective view of one embodiment of Applicants' accessor positioned adjacent a column of storage slots disposed within Applicants' data storage and retrieval system showing a portable cartridge properly disposed in a storage slot.

Referring now to FIG. 4B, portable data storage cartridge 730 is shown removeably disposed in storage slot 710 (FIG. 4A). First end 732 is shown disposed adjacent rear portion 712 of storage slot 710. Second end 734 of cartridge 730 extends outwardly from open end 714 of storage slot 710.

Devices 1330 and 1340 are disposed on Applicants' accessor such that beam 1350 is obstructed by second end portion 734 of cartridge 730, when cartridge 730 is disposed in storage slot 710. Therefore, beam 1350 can be used to ascertain whether a column of storage slots is empty. Applicants' accessors 110, 1300, 1400, 1600, or 1700, can be used to inventory the contents of Applicants' data storage and retrieval system.

Figure 6:
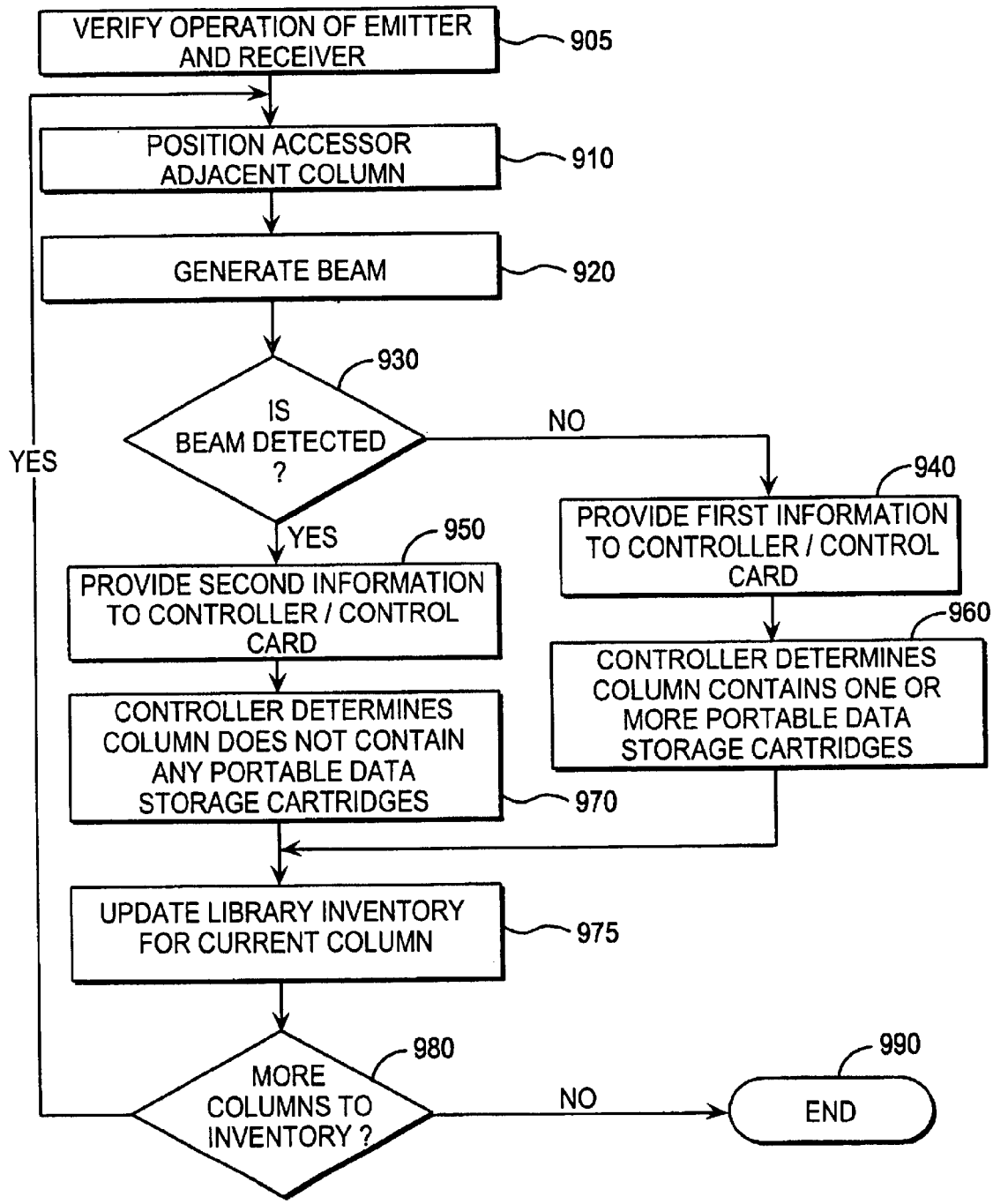
FIG. 6 is a flow chart summarizing the steps of Applicants' method to assist the inventory of Applicants' data storage and retrieval system using Applicants' accessor.

FIG. 6 summarizes Applicants' method to inventory the contents of Applicants' data storage and retrieval system using Applicants' accessor. The steps of FIG. 6 will be described using accessor 1300. As noted above, however, the steps of FIG. 6 can be implemented using other embodiments of Applicants' accessor. In certain embodiments of Applicants' method, the operation of the emitter and the receiver are first verified in step 905. This verification step involves activating the emitter and verifying detection of the beam by the receiver. As those skilled in the art will appreciate, this verification step must necessarily be performed in a location where no stored cartridges, or other objects, can block beam 1350. This verification step may be done at calibration, configuration, power-on, in response to an operator command, prior to an inventory, during a re-zero, etc.

In step 910, the library controller, such as controller 150 (FIG. 1A)/controller 250 (FIG. 2)/accessor control card 320 (FIGS. 1B, 3A, 3B, 3C), positions the accessor adjacent column 700 (FIGS. 4A–4E). In one embodiment, where device 1330 (FIGS. 10, 11) comprises an emitter, in step 920 (FIG. 6) device 1330 is activated to produce beam 1350 (FIGS. 10, 11). In other embodiments, where device 1340 comprises an emitter, device 1340 is activated in step 920 to produce beam 1350.

In step 930, the library controller determines if the receiver, i.e. either device 1330 or 1340, can detect beam 1350. If receiver 1330/1340 does not detect beam 1350, then in step 940 that receiver provides first information to the library controller that beam 1350 was not detected. In step 960, the library controller determines that the column being inventoried contains one or more portable data storage cartridges removeably disposed therein. For example, referring to FIG. 4B, end portion 734 obstructs beam 1350, and therefore, beam 1350 is not detected by receiver 1330/1340. This being the case, in the embodiment shown in FIG. 4B the library determines that column 700 contains one or more portable data storage cartridges disposed therein. Applicants' method transitions from step 960 to step 975 wherein the library controller updates the library inventory for the current column.

In the event receiver 1330/1340 does detect beam 1350, then in step 950 the receiver provides second information to the library controller that beam 1350 was detected. In step 970, the library controller determines that the column being inventoried contains no portable data storage cartridges removeably disposed therein. For example, referring now to FIG. 4A, beam 1350 is detected. Therefore, controller 150/250/accessor control card 320 determines that in the embodiment shown in FIG. 4A column 700 contains no portable data storage cartridges removeably disposed therein. Applicants' method transitions from step 970 to step 975 wherein the library updates the inventory for the current column.

Applicants' method transitions from step 975 to step 980 wherein the library controller determines if there are additional columns of storage slots to inventory. If in step 980 the controller determines that additional columns remain to be inventoried, then Applicants' method transitions to step 910 and the accessor is positioned adjacent the next column. If, however, no additional columns remain to be inventoried, then in step 990 Applicants' method terminates.

FIG. 5 shows accessor 1600 disposed adjacent first column of storage slots 810 and second column of storage slots 820. As those skilled in the art will appreciate, if the Y axis comprises the vertical axis, then columns 810 and 820 comprise vertical columns. As those skilled in the art will further appreciate, if the Y axis comprises a horizontal axis, then columns 810 and 820 comprise horizontal columns.

In the embodiment shown in FIG. 5, accessor 1600 includes first gripper mechanism 218 and second gripper mechanism 219. Lifting servo section 214 is rotatably disposed on pillar 212 such that part or all of lifting servo section 214 can rotate to allow first gripper mechanism 218 and second gripper mechanism 219 to retrieve cartridges from storage slots disposed in both column 810 and column 820.

First column 810 can comprise, for example, a portion of first storage wall 202 (FIG. 2) in system 200 (FIG. 2). Second column 820 can comprise, for example, a portion of second storage wall 204 (FIG. 2). Using the method summarized in FIG. 6, accessor 1600 can simultaneously inventory the contents of column 810 using device 1460, device 1465, and beam 1467, and the contents of column 820 using device 1430, device 1435, and beam 1437. In the embodiment of FIG. 5, beam 1467 is blocked by cartridge 830, and therefore, Applicants' method would determine that one or more cartridges are disposed in column 810. Beam 1437, however, is not blocked, and therefore, Applicants' method would determine that no cartridges are disposed in column 820.

Applicants' invention further includes an article of manufacture, including Applicants' data storage and retrieval system, comprising a computer useable medium having computer readable program code disposed therein for inventorying a data storage and retrieval system using Applicants' accessor.

Figure 4C:
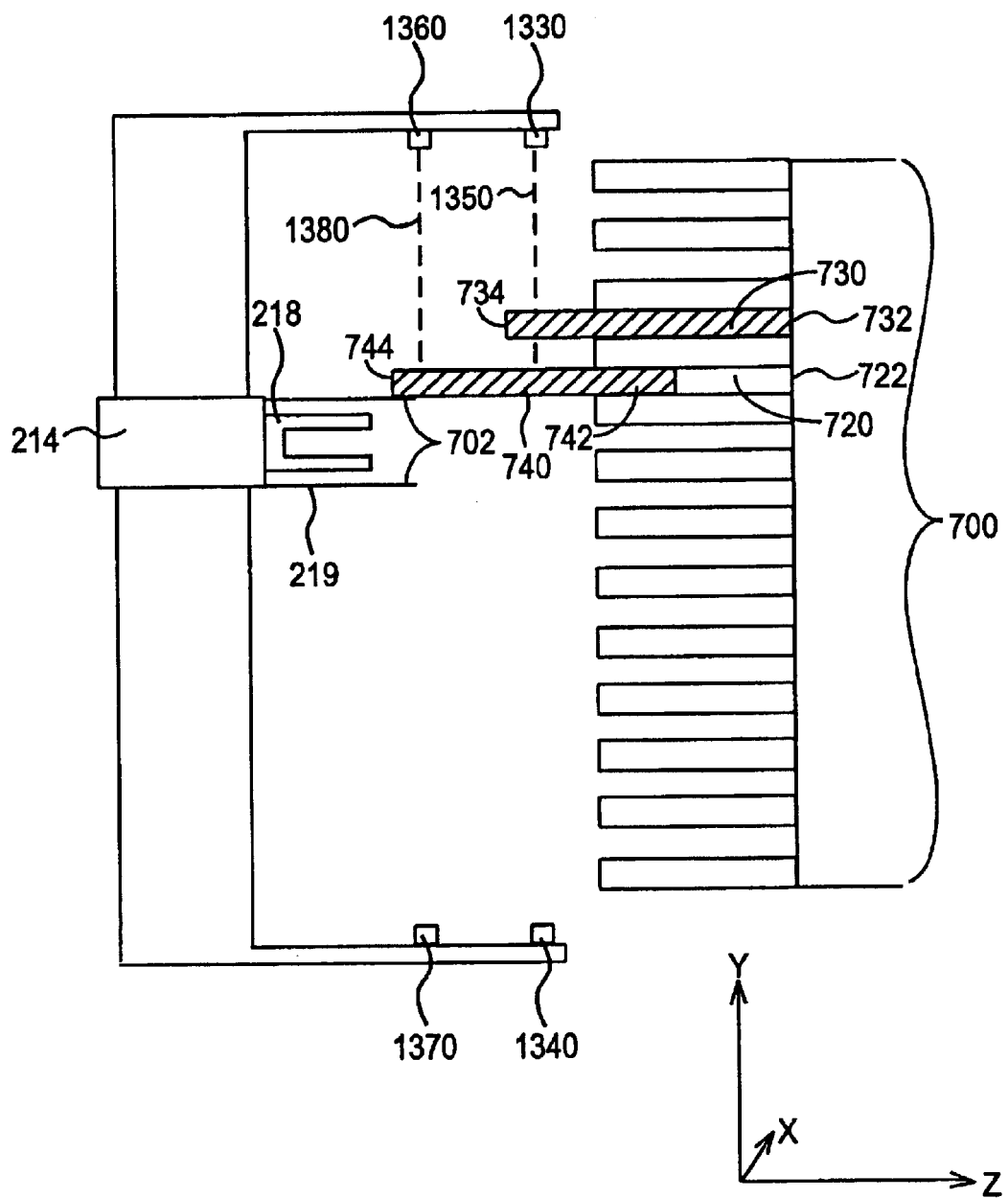
FIG. 4C is a perspective view of one embodiment of Applicants' accessor positioned adjacent a column of storage slots disposed within Applicants' data storage and retrieval system showing a portable cartridge improperly stored in a storage slot.

Applicants' invention further includes a method to prevent collisions between an accessor and an improperly stored portable data storage cartridge. Referring now to FIG. 4C, cartridge 730 is properly disposed in storage slot 710 (FIG. 4A) with first end portion 732 disposed adjacent rear portion 712 (FIG. 4A) of storage slot 710. Portable data storage cartridge 740, however, is only partially inserted into storage slot 720 (FIG. 4A). First end 742 of cartridge 740 is not disposed adjacent rear portion 722 of storage slot 720.

To retrieve cartridge 730 from storage slot 710, the library controller, such as controller 150 (FIG. 1A), controller 250

(FIG. 2), or accessor control card 320 (FIGS. 1B, 3A, 3B, 3C), positions the accessor adjacent a column of storage slots, such as column 700. The library controller then causes the lifting servo section disposed on the accessor, such as lifting servo section 214, to move in the +Y direction in order to position the gripper mechanism, such as gripper mechanism 218, adjacent distal end 734 of cartridge 730.

Distal end portion 744 of cartridge 740 extends outwardly sufficiently far, however, that end portion 702 of housing 219 would strike end portion 744 as lifting servo section moves in the +Y direction. Such a collision between the accessor and cartridge 740 could damage gripper mechanism 218, cartridge 740, a drive, etc.

Figure 7:
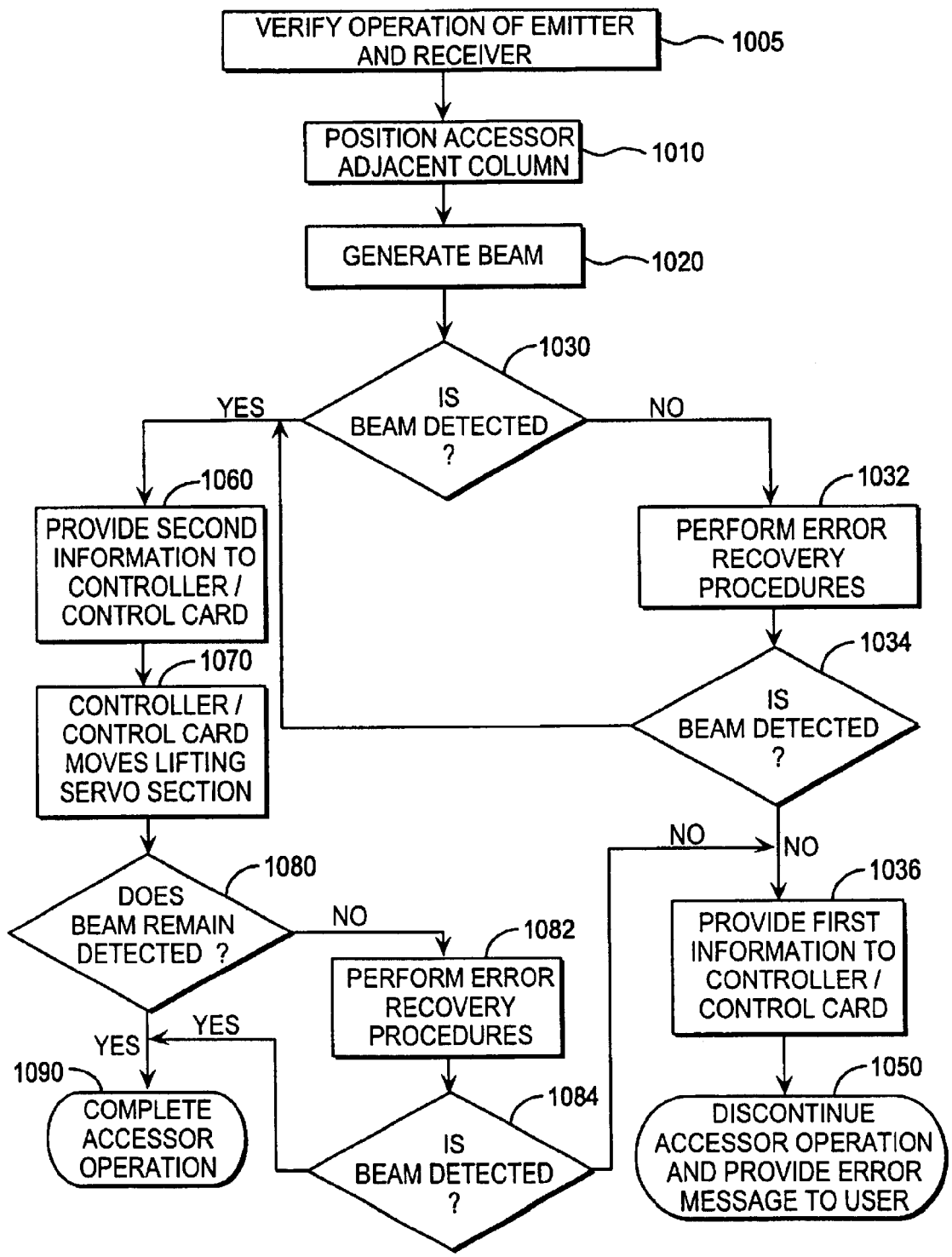
FIG. 7 is a flow chart summarizing the steps of Applicants' method to prevent collisions between Applicants' accessor and one or more portable data storage cartridges improperly stored within Applicants' data storage and retrieval system.

Such a damaging collision can be prevented, however, by use of beam 1380. FIG. 7 summarizes Applicants' method to prevent collisions between an accessor and an improperly stored portable data storage cartridge. The embodiments of Applicants' method summarized in FIG. 7 can be implemented using accessors 110, 1300, 1500, 1600, or 1800.

In certain embodiments, in step 1005 the operation of the emitter and the receiver is first verified. Such a verification involves activating the emitter to generate a beam and then verifying detection of that beam by the receiver. As those skilled in the art will appreciate, such a verification step must necessarily be performed in a location where no stored cartridges, or other objects, can block the emitted beam. This verification step may be done at calibration, configuration, power on, in response to an operator command, prior to an inventory, during a re-zero, etc.

In step 1010, the library controller, such as controller 150/250/accessor control card 320, positions the accessor adjacent a column of storage slots, such as column 700, to retrieve a designated portable data storage cartridge, such as cartridge 730. Before moving lifting servo section 214 in the +Y direction, however, in step 1020 the library activates the proximal emitter, such as emitter 1360 to generate beam 1380.

In step 1030, the proximal receiver, such as receiver 1370, is activated to ascertain whether beam 1380 can be detected. If receiver 1370 detects beam 1380 in step 1030, then in step 1060 receiver 1370 provides second information to the controller, such as controller 150/controller 250/control card 320, that beam 1380 was detected. This being the case, in step 1070 the controller causes the lifting servo section disposed on the accessor to move in the +Y direction.

In certain embodiments of Applicants method, operation of the emitter and the receiver is continued during the movement of the lifting servo section. In these embodiments, in step 1080 the receiver continues to provide information to the library controller regarding the continued, or discontinued, detection of beam 1380. In the event the receiver continues to detect beam 1380, then in step 1090 the library controller causes the accessor to complete its operation. If beam 1380 becomes obstructed, however, and the receiver can no longer detect that beam, then in step 1082 the controller performs certain error recovery procedures, such as re-energizing the emitter. In the event beam 1380 is thereafter detected, then Applicants' method transitions to step 1090. If, however, beam 1380 remains undetected in step 1084, then Applicants' method transitions to step 1036 wherein the receiver provides first information to the library controller. Upon receipt of such first information, the library controller in step 1050 discontinues accessor operation, and may generate and provide an error message to the user.

Similarly, if receiver 1370 does not initially detect beam 1380 in step 1030, then in step 1032 the controller performs certain error recovery procedures, such as re-energizing the emitter. In the event beam 1380 is thereafter detected in step 1034, then Applicants' method transitions to step 1060. If, however, beam 1380 remains undetected after step 1034, then in step 1036 receiver 1370 provides first information to the controller that the beam was not detected. In response to receipt of that first information, in step 1050 the controller discontinues accessor operation, generates and provides an error message to the user that a portable data storage cartridge is improperly disposed in the column. Alternatively, the column may be avoided allowing the library operations to continue.

Applicants' invention her includes an article of manufacture, including Applicants' data storage and retrieval system, comprising a computer useable medium having computer readable program code disposed therein for preventing collisions between Applicants' accessor and information storage cartridges moveably disposed in a data storage and retrieval system.

Applicants' apparatus and method includes embodiments to monitor both retrieval of a portable data storage cartridge from a storage slot, a data storage device, an import/export station, and the like, and insertion of a portable data storage cartridge into a storage slot, a data storage device, an import export station, and the like. These embodiments of Applicants' method can be implemented using accessors 110, 1300, 1500, 1600, and 1800.

Figure 4D:
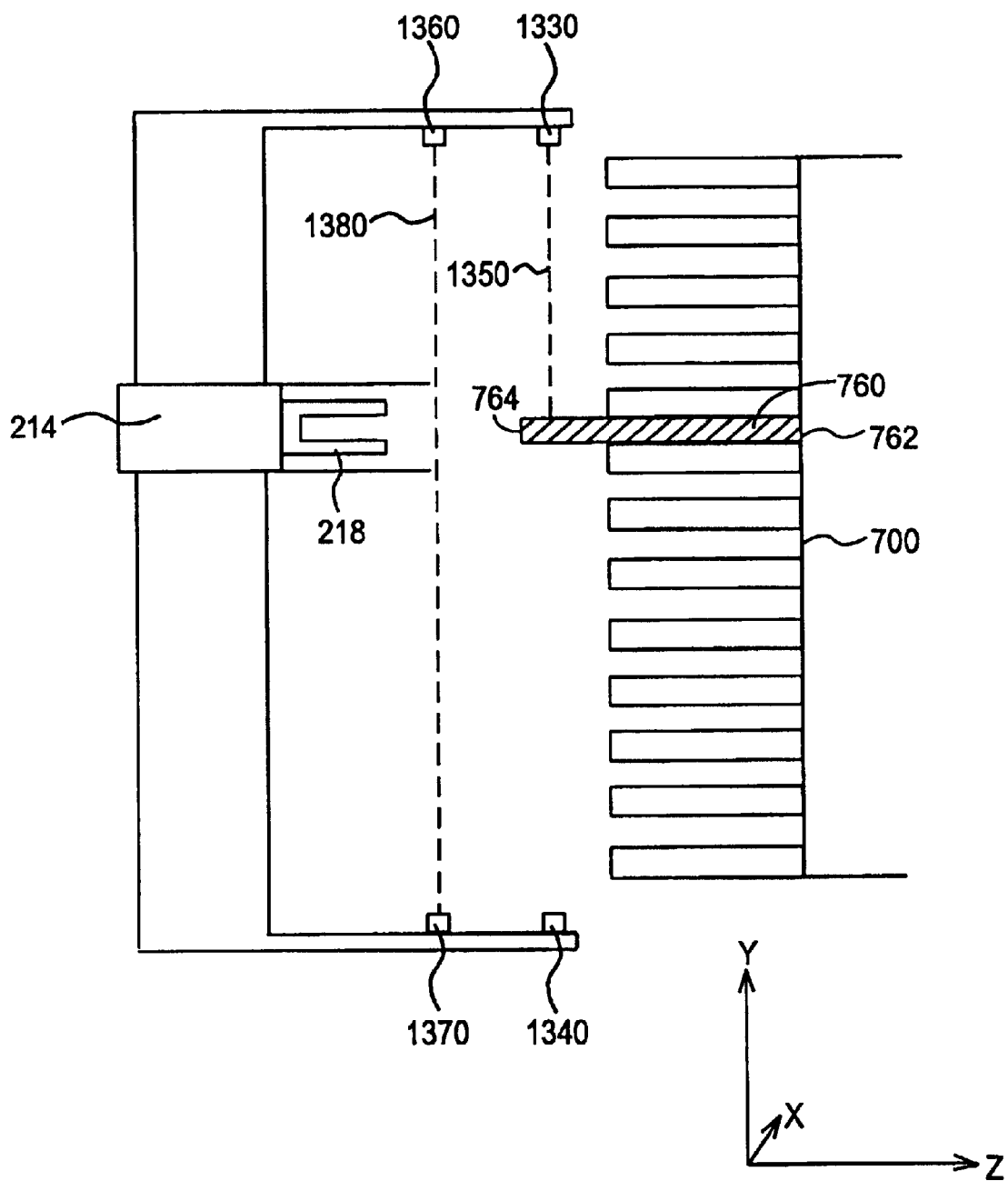
FIG. 4D is a perspective view of a gripper mechanism disposed adjacent a portable cartridge disposed in a column of storage slots.
Figure 8:
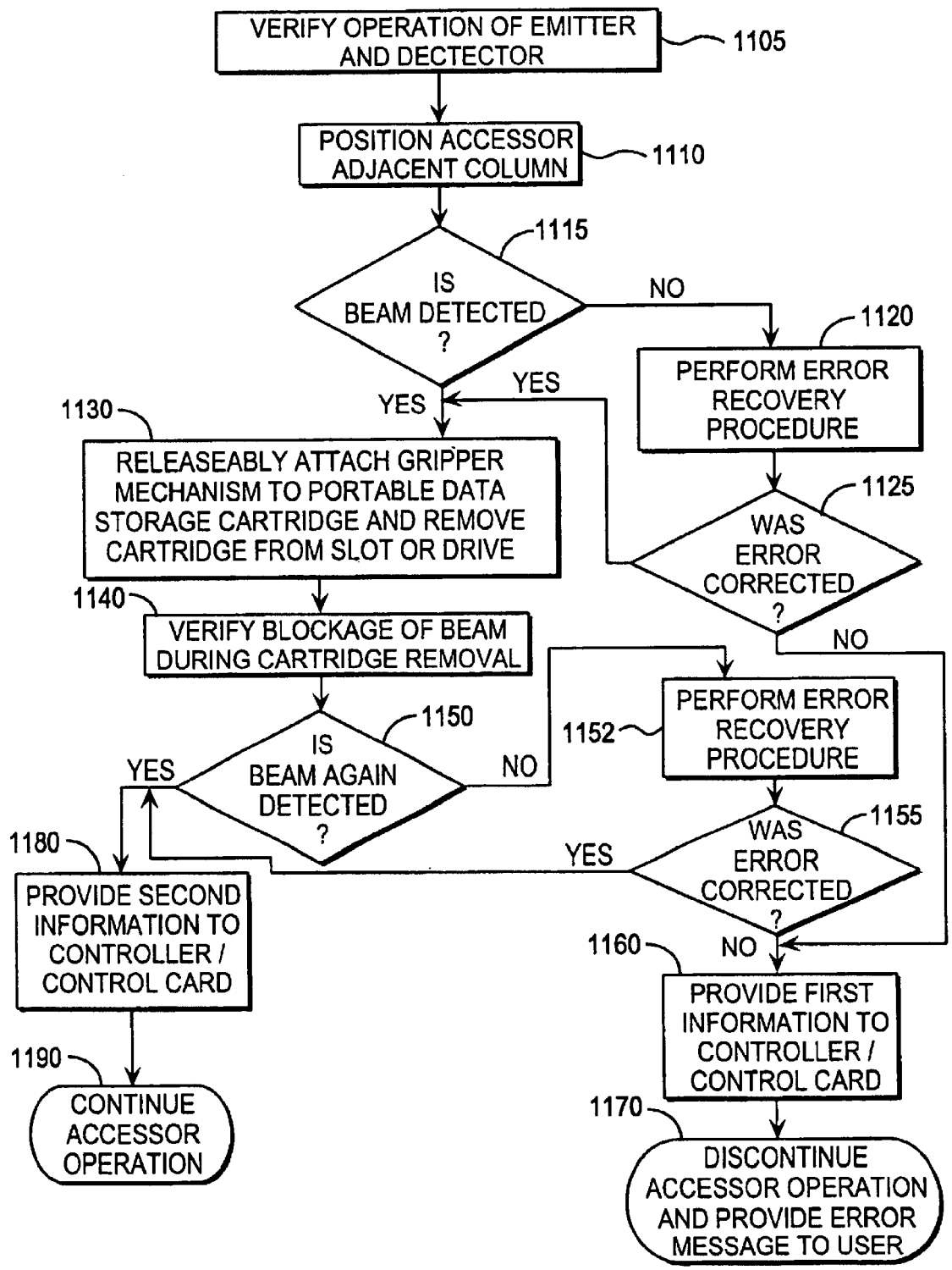
FIG. 8 is a flow chart summarizing the steps of Applicants' method to monitor the retrieval of a portable data storage cartridge from a storage slot disposed within Applicants' data storage and retrieval system.

Referring to FIG. 4D and FIG. 8, certain embodiments of Applicants' method to monitor retrieval of a portable data storage cartridge from a storage slot include step 1105 wherein the library controller, such as controller 150/250/ accessor control card 320, first verifies operation of an emitter/receiver pair disposed on the accessor before positioning that accessor to retrieve a portable data storage cartridge. Such a verification involves activating the emitter to generate a beam and then verifying detection of that beam by the receiver. As those skilled in the art will appreciate, such a verification step must necessarily be performed in a location where no stored cartridges, or other objects, can block the emitted beam. This verification step may be done at calibration, configuration, power on, in response to an operator command, prior to an inventory, during a re-zero, etc.

In step 1110, the library controller positions an accessor in the X direction adjacent a storage column, such as column 700, and the lifting servo section disposed on that accessor is positioned in the Y direction such that a gripper mechanism 218 disposed on lifting servo section 214 is positioned adjacent the designated portable data storage cartridge, such as portable data storage cartridge 760. In step 1115 beam 1380 is generated, and detection of that beam verified prior to removal of the cartridge from the storage slot. In the event beam 1380 is not detected, then in step 1120 the controller performs error recovery procedures, such as re-energizing the emitter. If reception of beam 1380 is verified, then Applicants' method transitions to step 1130. Alternatively, if beam 1380 is not detected in step 1125 after performing error recovery procedures, then Applicants' method transitions to step 1160. Alternatively, steps 1115, 1120, and 1125 may be omitted.

In step 1130 (FIG. 8), gripper mechanism 218 is then advanced from the position shown in FIG. 4D in the +Z direction to an extended position such that end portion 764 of cartridge 760 is releaseably attached to that gripper mechanism. Thereafter, gripper mechanism 218, along with the releaseably attached cartridge 760, is then moved in the −Z direction to a retracted position thereby removing cartridge 760 from its storage slot. Alternatively, the cartridge may be removed from a drive in step 1130. In step 1140 blockage of beam 1380 is verified during the removal operation. Alternatively, step 1140 may be omitted.

Figure 4E:
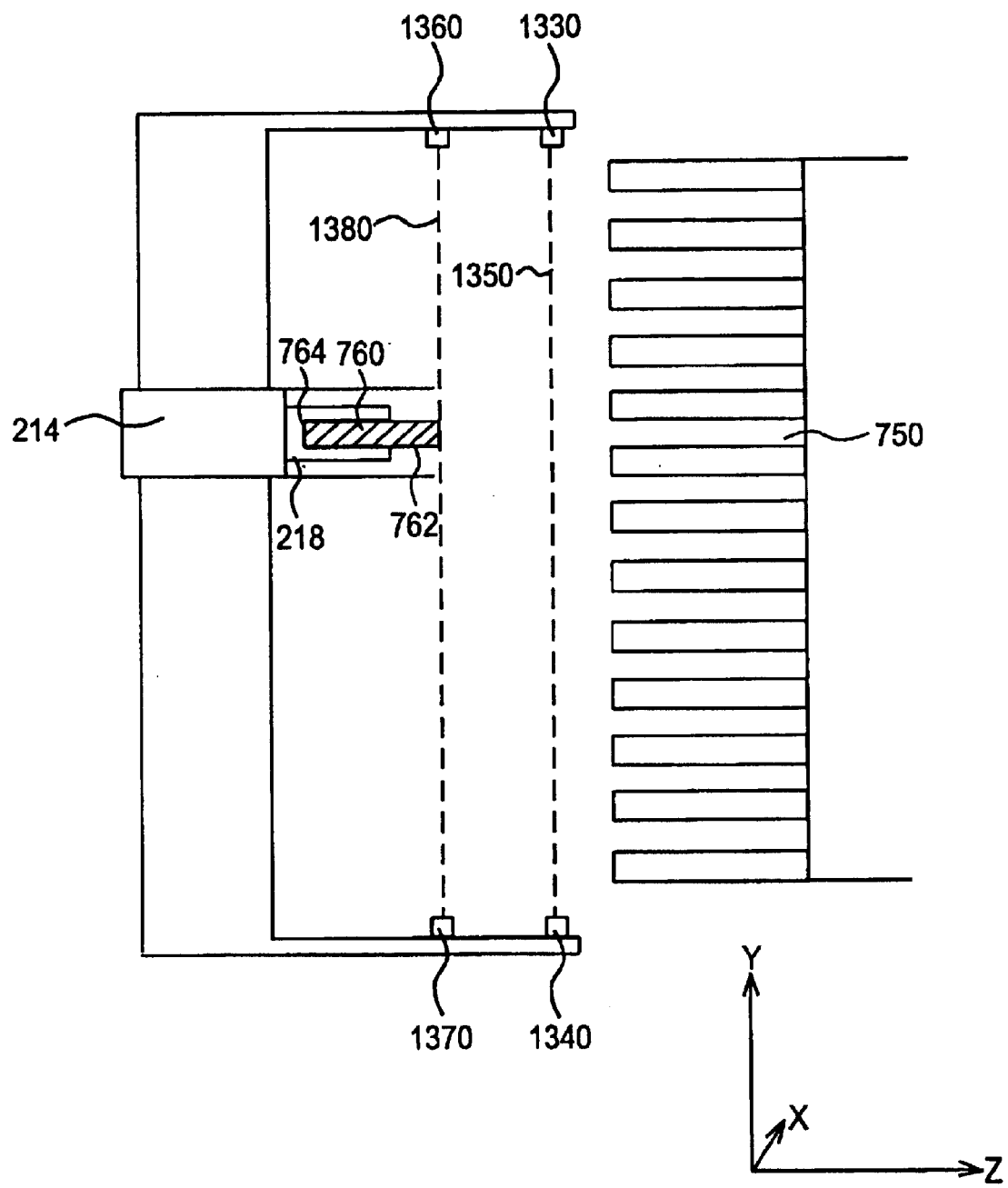
FIG. 4E is a perspective view showing a portable data storage cartridge releaseably attached to a gripper mechanism disposed on one embodiment of Applicants' accessor in relation to a storage slot for that portable data storage cartridge.

Referring to FIG. 4E, gripper mechanism 218 is shown in a retracted position after removing cartridge 760 from slot 750. In step 1150, the library controller, such as controller 150/250/accessor control card 320, verifies detection of beam 1380. Detection of beam 1380 necessarily means that end portion 762 of cartridge 760 has been completely removed from storage slot 750. If beam 1380 is detected, receiver 1370 provides second information to the library controller that beam 1380 is detected. In step 1190, the library controller instructs the accessor to move in the X direction and/or Y direction to deliver releaseably attached cartridge 760 to a data storage drive, such as drive 130 (FIG. 1A)/230 (FIG. 2) 240 (FIG. 2), or a storage slot.

If, however, receiver 1370 does not detect beam 1380 in step 1150, then in step 1152 the library controller performs error recovery procedures, such as re-energizing the emitter or moving gripper 218. If beam 1380 is thereafter detected, then Applicants' method transitions to step 1180. If beam 1380 is still not detected after performing error recovery procedures, then in step 1160 receiver 1370 provides first information to the library controller regarding beam non-detect. In step 1170, the library controller discontinues accessor operation, and may generate and provide an error message to the user that portable data storage cartridge 760 is not properly attached to gripper mechanism 218. Alternatively, steps 1152 and 1155 maybe omitted. In this case, if Applicants' method determines in step 1150 that beam 1380 is not detected, then Applicants' method transitions from step 1150 to step 1160.

Applicants' invention further includes an article of manufacture, such as Applicants' data storage and retrieval system, comprising a computer useable medium having computer readable program code disposed therein for monitoring the removal of a data storage cartridge from a storage slot, data storage device, import/export stations, and the like, using Applicants' accessor.

Figure 9:
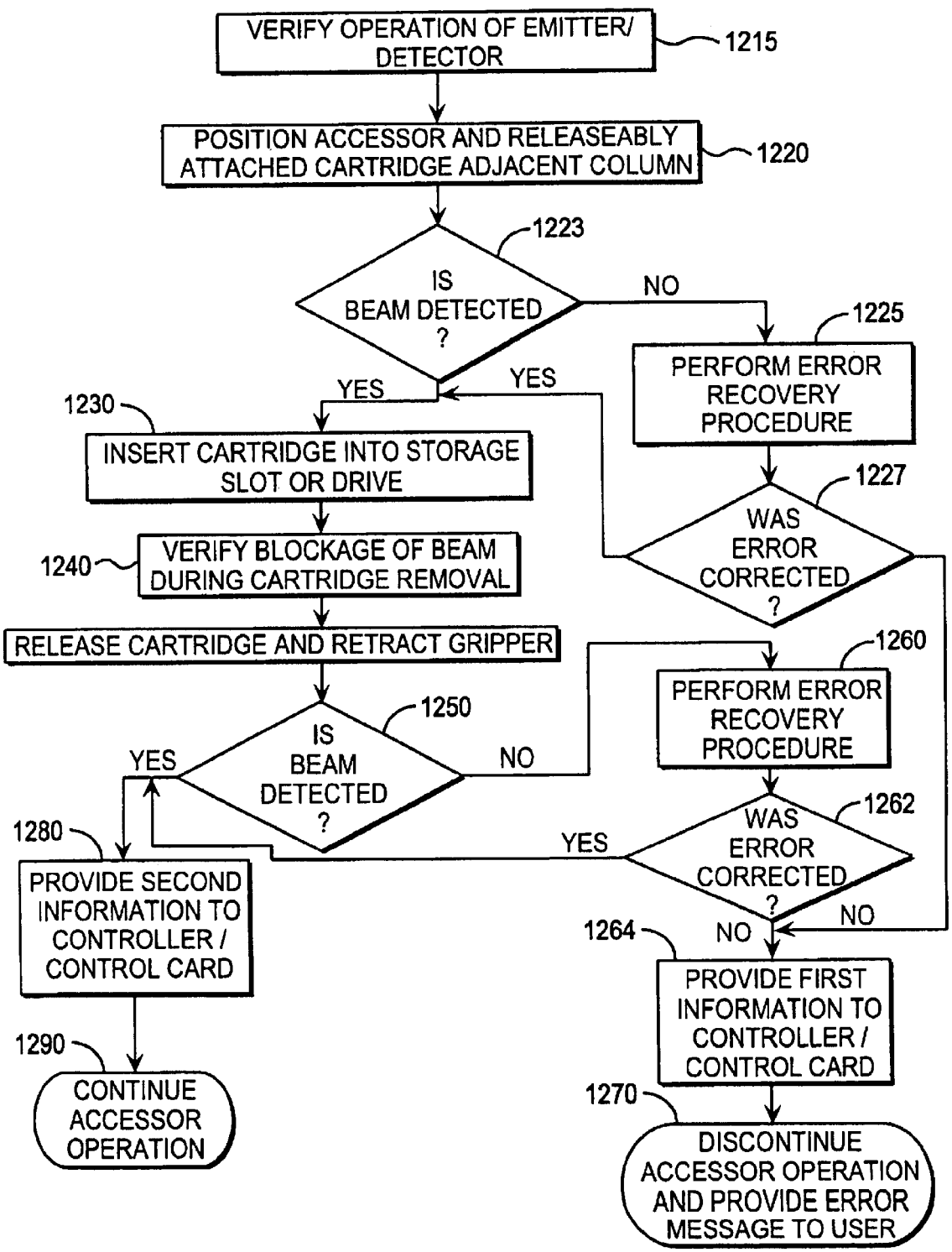
FIG. 9 is a flow chart summarizing the steps of Applicants' method to monitor the insertion of a portable data storage cartridge into a storage slot disposed within Applicants' data storage and retrieval system.

Referring to FIGS. 4E and 9, Applicants' invention includes a method to monitor the insertion of a portable data storage cartridge into a storage slot, a data storage device, an import/export station, and the like. Such an operation occurs, for example, after an accessor retrieves a portable data storage cartridge from a data storage drive, such as drive 130 (FIG. 1A)/drive 230 (FIG. 2)/drive 240 (FIG. 2), transports that releaseably attached accessor to a designated storage slot, and places that cartridge into the designated storage slot. Referring to FIGS. 4E and 9, in certain embodiments of Applicants' method, the operation of the emitter/detector pair is verified in step 1215. In these embodiments in step 1215 the library controller, such as controller 150/250/accessor control card 320, activates the emitter and the receiver, and verifies detection of the beam generated by the emitter, prior to positioning the accessor adjacent a designated column. This verification step may be done at calibration, configuration, power on, in response to an operator command, prior to an inventory, during a re-zero, etc.

In step 1220, the library controller positions the accessor carrying the releaseably attached portable data storage cartridge adjacent the vertical or horizontal column containing the designated storage slot, such as storage slot 750. In step 1223, detection of beam 1380 is verified prior to insertion of the cartridge into the storage slot. In the event beam 1380 is not detected, then in step 1225 the controller performs certain error recovery procedures, such as re-energizing the emitter. In the event beam 1380 is then detected in step 1227, Applicants' method transitions to step 1230. If beam 1380 remains undetected, then Applicants' method transitions to steps 1264 and 1270. Alternatively, steps 1223, 1225, and 1227, may be omitted.

In step 1230, gripper mechanism 218 is moved in the +Z direction to insert cartridge 760 into storage slot 750. Alternatively, the cartridge may be inserted into a drive or an input/output station. Still further, lifting servo section 214 may be positioned in front of storage slot 750 in step 1220. In step 1240, blockage of beam 1380 is verified during the insertion operation. Alternatively, step 1240 may be omitted.

After inserting cartridge 760 into slot 750, gripper mechanism 218 is released from cartridge 760 and is retracted to a retracted position shown in FIG. 4D. Thereafter in step 1250, detection of beam 1380 is verified. If cartridge 760 is properly disposed in storage slot 750, then beam 1380 is detected by receiving device 1370. In the event receiver 1370 detects beam 1380 in step 1250, then in step 1280 that receiver provides second information to the library controller. Upon receipt of such second information, in step 1290 the library controller allows the accessor to continue operating.

If in step 1250, however, receiver 1370 does not detect beam 1380, then the library controller performs error recovery procedures in step 1260. If after performing those error recovery procedures, beam 1380 is still not detected, then in step 1264 receiver 1370 provides first information regarding beam non-detect to the library controller. Thereafter, in step 1270 the controller discontinues operation of the accessor, and may generate and provide an error message to the user that cartridge 760 is improperly disposed in storage slot 750.

Applicants' invention further includes an article of manufacture, such as Applicants' data storage and retrieval system, comprising a computer useable medium having computer readable program code disposed therein for monitoring the insertion of a data storage cartridge into a storage slot, data storage device, import/export stations, and the like, using Applicants' accessor.

While the preferred embodiments of the present invention have been illustrated in detail, it should be apparent that modifications and adaptations to those embodiments may occur to one skilled in the art without departing from the scope of the present invention as set forth in the following claims. For example, while the figures, and the written description above, discuss Applicants' method to inventory storage cells, provide collision avoidance at storage cells, monitor cartridge insertion into storage cells, and monitor cartridge retrieval from storage cells, one skilled in the art will appreciate that Applicants' method is also applicable at data storage drives, I/O slots, import/export stations, and the like.

We claim:

1. An accessor moveably disposed within a data storage and retrieval system, comprising:
   a first emitter disposed at a first position on said accessor, wherein said first emitter is capable of providing first electromagnetic radiation having a first frequency;
   a first receiver disposed at a second position on said accessor, wherein said first receiver is capable of detecting said first electromagnetic radiation;
   a gripper mechanism disposed on a lifting servo section, wherein said first emitter is not disposed on said gripper mechanism or on said lifting servo section, and wherein said first receiver is not disposed on said gripper mechanism or on said lifting servo section;

wherein said first emitter has a facing relationship with said first receiver.

2. The accessor of claim 1, further comprising a top portion and a carriage portion, wherein said first position is disposed adjacent said top position and wherein said second position is disposed adjacent said carriage portion.

3. The accessor of claim 1, further comprising:
a second emitter disposed at a third position on said accessor, wherein said second emitter is capable of providing second electromagnetic radiation having a second frequency;
a second receiver disposed at a fourth position on said accessor, wherein said second receiver is capable of detecting said second electromagnetic radiation;
wherein said second emitter has a facing relationship with said second receiver; and
wherein said second emitter is not disposed on said gripper mechanism or on said lifting servo section, and wherein said second receiver is not disposed on said gripper mechanism or on said lifting servo section.

4. The accessor of claim 3, wherein said first frequency substantially equals said second frequency.

5. The accessor of claim 3, further comprising a top portion and a carriage portion, wherein said third position is disposed adjacent said top portion and wherein said fourth position is disposed adjacent said carriage portion.

6. The accessor of claim 3, further comprising:
a third emitter disposed at a fifth position on said accessor, wherein said third emitter is capable of providing third electromagnetic radiation having a third frequency;
a third receiver disposed at a sixth position on said accessor, wherein said third receiver is capable of detecting said third electromagnetic radiation;
wherein said third emitter has a facing relationship with said third receiver; and
wherein said third emitter is not disposed on said gripper mechanism or on said lifting servo section, and wherein said third receiver is not disposed on said gripper mechanism or on said lifting servo section.

7. The accessor of claim 6, further comprising a top portion and a carriage portion, wherein said fifth position is disposed adjacent said top portion and wherein said sixth position is disposed adjacent said carriage portion.

8. The accessor of claim 6, wherein said first frequency, said second frequency, and said third frequency, are substantially equal.

9. The accessor of claim 6, further comprising:
a fourth emitter disposed at a seventh position on said accessor, wherein said fourth emitter is capable of providing fourth electromagnetic radiation having a fourth frequency;
a fourth receiver disposed at an eighth position on said accessor, wherein said fourth receiver is capable of detecting said fourth electromagnetic radiation;
wherein said fourth emitter has a facing relationship with said fourth receiver; and
wherein said fourth emitter is not disposed on said gripper mechanism or on said lifting servo section, and wherein said fourth receiver is not disposed on said gripper mechanism or on said lifting servo section.

10. The accessor of claim 9, further comprising a top portion and a carriage portion, wherein said seventh position is disposed adjacent said top portion and wherein said eighth position is disposed adjacent said carriage portion.

11. The accessor of claim 9, wherein said third frequency substantially equals said fourth frequency.

12. The accessor of claim 9, wherein said first frequency, said second frequency, said third frequency, and said fourth frequency are substantially equal.

13. A data storage and retrieval system, comprising one or a plurality of accessors moveably disposed therein, wherein one or more of said one or a plurality of accessors comprise:
a first emitter disposed at a first position on said accessor, wherein said first emitter provides first electromagnetic radiation having a first frequency;
a first receiver disposed at a second position on said accessor, wherein said first receiver is capable of receiving said first electromagnetic radiation;
a gripper mechanism disposed on a lifting servo section, wherein said first emitter is not disposed on said gripper mechanism or on said lifting servo section, and wherein said first receiver is not disposed on said gripper mechanism or on said lifting servo section;
wherein said first emitter has a facing relationship with said first receiver.

14. The data storage and retrieval system of claim 13, wherein said one or more accessors further comprise a top portion and a carriage portion, and wherein said first position is disposed adjacent said top position and wherein said second position is disposed adjacent said carriage portion.

15. The data storage and retrieval system of claim 13, wherein said one or more accessors further comprise:
a second emitter disposed at a third position on said accessor, wherein said second emitter provides second electromagnetic radiation having a second frequency;
a second receiver disposed at a fourth position on said accessor, wherein said second receiver is capable of receiving said second electromagnetic radiation;
wherein said second emitter has a facing relationship with said second receiver; and
wherein said second emitter is not disposed on said gripper mechanism or on said lifting servo section, and wherein said second receiver is not disposed on said gripper mechanism or on said lifting servo section.

16. The data storage and retrieval system of claim 15, wherein said first frequency is substantially equal to said second frequency.

17. The data storage and retrieval system claim 15, wherein said one or more accessors further comprise a top portion and a carriage portion, wherein said third position is disposed adjacent said top position and wherein said fourth position is disposed adjacent said carriage portion.

18. The data storage and retrieval system of claim 15, wherein one or more of said one or a plurality of accessors further comprise:
a third emitter disposed at a fifth position on said accessor, wherein said third emitter is capable of providing third electromagnetic radiation having a third frequency;
a third receiver disposed at a sixth position on said accessor, wherein said third receiver is capable of receiving said third electromagnetic radiation;
wherein said third emitter has a facing relationship with said third receiver; and
wherein said third emitter is not disposed on said gripper mechanism or on said lifting servo section, and wherein said third receiver is not disposed on said gripper mechanism or on said lifting servo section.

19. The data storage and retrieval system of claim 18, wherein said one or more accessors further comprise a top portion and a carriage portion, wherein said fifth position is disposed adjacent said top position and wherein said sixth position is disposed adjacent said carriage portion.

20. The data storage and retrieval system of claim 18, wherein said first frequency, said second frequency, and said third frequency are substantially equal.

21. The data storage and retrieval system of claim 18, wherein said one or more accessors further comprise:
   a fourth emitter disposed at a seventh position on said accessor, wherein said fourth emitter provides fourth electromagnetic radiation having a fourth frequency;
   a fourth receiver disposed at an eighth position on said accessor, wherein said fourth receiver is capable of receiving said fourth electromagnetic radiation;
   wherein said fourth emitter has a facing relationship with said fourth receiver;
   wherein said fourth emitter is not disposed on said gripper mechanism or on said lifting servo section, and wherein said fourth receiver is not disposed on said gripper mechanism or on said lifting servo section.

22. The data storage and retrieval system of claim 21, wherein said one or more accessors further comprise a top portion and a carriage portion, wherein said seventh position is disposed adjacent said top position and wherein said eighth position is disposed adjacent said carriage portion.

23. The data storage and retrieval system of claim 21, wherein said third frequency and said fourth frequency are substantially equal.

24. The data storage and retrieval system of claim 21, wherein said first frequency, said second frequency, said third frequency, and said fourth frequency are substantially equal.

25. A method to inventory portable data storage cartridges disposed within a data storage and retrieval system, wherein said data storage and retrieval system includes a library controller, one or a plurality of storage slots disposed in one or more vertical or horizontal columns, and one or more portable data storage cartridges disposed in one or more of said one or a plurality of storage slots, comprising the steps of:
   moveably disposing an accessor within said data storage and retrieval system, wherein said accessor comprises an emitter capable of emitting electromagnetic radiation, and a receiver capable of detecting said electromagnetic radiation, wherein said emitter and said receiver have a facing relationship;
   positioning said accessor adjacent one of said one or more columns;
   emitting said electromagnetic radiation;
   providing first information to said library controller if said receiver does not detect said electromagnetic radiation, wherein said first information indicates that one or more cartridges is disposed in said column.

26. The method of claim 25, wherein said accessor further comprises:
   a top portion and a carriage portion;
   wherein said emitter is disposed adjacent said top portion and said receiver is disposed adjacent said carriage portion.

27. The method of claim 25, further comprising the steps of:
   emitting said electromagnetic radiation prior to positioning said accessor adjacent one of said one or more columns; and
   detecting said electromagnetic radiation by said receiver prior to positioning said accessor adjacent one of said one or more columns.

28. A method to prevent a collision between an accessor moveably disposed within a data storage and retrieval system and a portable data storage cartridge improperly disposed in a storage slot or a data storage drive disposed within a vertical or horizontal column, wherein said data storage and retrieval system comprises a library controller, said method comprising the steps of:
   providing an accessor comprising a lifting servo section, an emitter capable of emitting electromagnetic radiation, a receiver capable of detecting said electromagnetic radiation, wherein said emitter and said receiver have a facing relationship;
   positioning said accessor adjacent said column;
   emitting said electromagnetic radiation prior to moving said lifting servo section;
   providing first information to said library controller if said receiver does not detect said electromagnetic radiation, wherein said first information indicates that one or more cartridges is improperly disposed in said column.

29. The method of claim 28, wherein said accessor further comprises:
   a top portion and a carriage portion;
   wherein said emitter is disposed adjacent said top portion and said receiver is disposed adjacent said carriage portion.

30. The method of claim 28, further comprising the steps of:
   emitting said electromagnetic radiation prior to positioning said accessor adjacent said column; and
   detecting said electromagnetic radiation by said receiver prior to positioning said accessor adjacent said column.

31. A method to monitor removal of a portable data storage cartridge from a storage slot or a data storage drive disposed in a vertical or horizontal column disposed within a data storage and retrieval system comprising a library controller, comprising the steps of:
   moveably disposing an accessor within said data storage and retrieval system, wherein said accessor comprises a gripper mechanism, an emitter capable of emitting electromagnetic radiation, and a receiver capable of detecting said electromagnetic radiation, wherein said emitter and said receiver have a facing relationship, wherein said emitter is not disposed on said gripper mechanism and wherein said receiver is not disposed on said gripper mechanism;
   positioning said accessor adjacent said column;
   emitting said electromagnetic radiation;
   releaseably attaching said gripper mechanism to said portable data storage cartridge;
   removing said portable data storage cartridge from said storage slot;
   providing first information to said library controller if said receiver does not detect said electromagnetic radiation after removal of said portable data storage cartridge from said storage slot, wherein said first information indicates improper removal of said data storage cartridge.

32. The method of claim 31, wherein said accessor further comprises:
   a top portion and a carriage portion;
   wherein said emitter is disposed adjacent said top portion and said receiver is disposed adjacent said carriage portion.

33. The method of claim 31, further comprising the steps of:

emitting said electromagnetic radiation prior to positioning said accessor adjacent said column; and detecting said electromagnetic radiation by said receiver prior to positioning said accessor adjacent said column.

34. A method to monitor insertion of a portable data storage cartridge into a storage slot or a data storage drive disposed in a vertical or horizontal column disposed within a data storage and retrieval system comprising a library controller, comprising the steps of:

moveably disposing an accessor within said data storage and retrieval system, wherein said accessor comprises a gripper mechanism having a portable data storage cartridge releaseably attached thereto, an emitter capable of emitting electromagnetic radiation, and a receiver capable of detecting said electromagnetic radiation, wherein said emitter and said receiver have a facing relationship, wherein said emitter is not disposed on said gripper mechanism and wherein said receiver is not disposed on said gripper mechanism;

inserting said portable data storage cartridge into said storage slot;

emitting said electromagnetic radiation;

providing first information to said library controller if said receiver does not detect said electromagnetic radiation, wherein said first information indicates improper insertion of said data storage cartridge.

35. The method of claim 34, wherein said accessor further comprises:

a top portion and a carriage portion;

wherein said emitter is disposed adjacent said top portion and said receiver is disposed adjacent said carriage portion.

36. The method of claim 34, further comprising the steps of:

emitting said electromagnetic radiation prior to positioning said accessor adjacent said column; and detecting said electromagnetic radiation by said receiver prior to positioning said accessor adjacent said column.

37. A data storage and retrieval system comprising a computer useable medium having computer readable program code disposed therein for inventorying portable data storage cartridges disposed within a data storage and retrieval system, wherein said data storage and retrieval system includes a library controller, one or more storage slots disposed in one or more vertical or horizontal columns, one or more portable data storage cartridges disposed in said one or more storage slots, and an accessor comprising an emitter capable of emitting electromagnetic radiation, a receiver capable of detecting said electromagnetic radiation, wherein said emitter and said receiver have a facing relationship, the computer readable program code comprising a series of computer readable program steps to effect:

positioning said accessor adjacent one of said one or more columns;

emitting said electromagnetic radiation;

providing first information to said library controller if said receiver does not detect said electromagnetic radiation, wherein said first information indicates that a portable data storage cartridge is disposed in said column.

38. The data storage and retrieval system of claim 37, wherein said accessor further comprises:

a top portion and a carriage portion;

wherein said emitter is disposed adjacent said top portion and said receiver is disposed adjacent said carriage portion.

39. The data storage and retrieval system of claim 37, wherein said computer readable program code further comprises a series of computer readable program steps to effect:

emitting said electromagnetic radiation prior to positioning said accessor adjacent one of said one or more columns; and verifying detection of said electromagnetic radiation by said receiver prior to positioning said accessor adjacent one of said one or more columns.

40. A data storage and retrieval system comprising a computer useable medium having computer readable program code disposed therein for preventing collisions between an accessor moveably disposed within said data storage and retrieval system and one or more portable data storage cartridges improperly disposed within one or more storage slots or within one or more data storage drives disposed within one or more vertical or horizontal columns disposed within said data storage and retrieval system, wherein said data storage and retrieval system comprises a library controller, wherein said accessor comprises a lifting servo section, an emitter capable of emitting electromagnetic radiation, a receiver capable of detecting said electromagnetic radiation, wherein said emitter and said receiver have a facing relationship, the computer readable program code comprising a series of computer readable program steps to effect:

positioning said accessor adjacent one of said one or more columns;

emitting said electromagnetic radiation prior to moving said lifting servo section; and providing first information to said library controller if said receiver does not detect said electromagnetic radiation, wherein said first information indicates an improperly disposed portable data storage cartridge.

41. The data storage and retrieval system of claim 40, wherein said accessor further comprises:

a top portion and a carriage portion;

wherein said emitter is disposed adjacent said top portion and said receiver is disposed adjacent said carriage portion.

42. The data storage and retrieval system of claim 40, wherein said computer readable program code further comprises a series of computer readable program steps to effect:

emitting said electromagnetic radiation prior to positioning said accessor adjacent one of said one or more columns; and verifying detection of said electromagnetic radiation by said receiver prior to positioning said accessor adjacent one of said one or more columns.

43. A data storage and retrieval system comprising a computer useable medium having computer readable program code disposed therein for monitoring the removal of a portable data storage cartridge from a storage slot or a data storage drive disposed in a vertical or horizontal column disposed within a data storage and retrieval system, wherein said data storage and retrieval system comprises a library controller and an accessor moveably disposed therein, wherein said accessor comprises a gripper mechanism, an emitter capable of emitting electromagnetic radiation, a receiver capable of detecting said electromagnetic radiation, wherein said emitter and said receiver have a facing relationship, wherein said emitter is not disposed on said gripper mechanism and wherein said receiver is not disposed on said gripper mechanism, the computer readable program code comprising a series of computer readable program steps to effect:

positioning said accessor adjacent said column;

releaseably attaching said gripper mechanism to said portable data storage cartridge;

removing said portable data storage cartridge from said storage slot;

providing first information to said library controller if said receiver does not detect said electromagnetic radiation after removing said portable data storage cartridge, wherein said first information indicates improper removal of said portable data storage cartridge.

44. The data storage and retrieval system of claim 43, wherein said accessor further comprises:

a top portion and a carriage portion;

wherein said emitter is disposed adjacent said top portion and said receiver is disposed adjacent said carriage portion.

45. The data storage and retrieval system of claim 43, wherein said computer readable program code further comprises a series of computer readable program steps to effect:

emitting said electromagnetic radiation prior to positioning said accessor adjacent said column; and verifying reception of said electromagnetic radiation by said receiver prior to positioning said accessor adjacent said column.

46. A data storage and retrieval system comprising a computer useable medium having computer readable program code disposed therein for monitoring the insertion of a portable data storage cartridge into a storage slot or a data storage device disposed in a vertical or horizontal column disposed within a data storage and retrieval system, wherein said data storage and retrieval system comprises a library controller and an accessor moveably disposed therein, wherein said accessor comprises a gripper mechanism, a portable data storage cartridge releaseably attached to said gripper mechanism, an emitter capable of emitting electromagnetic radiation, a receiver capable of detecting said electromagnetic radiation, wherein said emitter and said receiver have a facing relationship, wherein said emitter is not disposed on said gripper mechanism and wherein said receiver is not disposed on said gripper mechanism, the computer readable program code comprising a series of computer readable program steps to effect:

positioning said accessor adjacent said column;

emitting said electromagnetic radiation;

inserting said releaseably attached portable data storage cartridge;

releasing said gripper mechanism from said portable data storage cartridge;

retracting said gripper mechanism;

providing first information to said library controller if said receiver does not detect said electromagnetic radiation, wherein said first information indicates improper insertion of said portable data storage cartridge.

47. The data storage and retrieval system of claim 46, wherein said accessor further comprises:

a top portion and a carriage portion;

wherein said emitter is disposed adjacent said top portion and said receiver is disposed adjacent said carriage portion.

48. The data storage and retrieval system of claim 46, wherein said computer readable program code further comprises a series of computer readable program steps to effect:

emitting said electromagnetic radiation prior to positioning said accessor adjacent said column; and verifying detection of said electromagnetic radiation by said receiver prior to positioning said accessor adjacent said column.

* * * * *